(12) United States Patent
Chunduru et al.

(10) Patent No.: US 12,204,681 B1
(45) Date of Patent: Jan. 21, 2025

(54) APPARATUS FOR AND METHOD OF DE-IDENTIFICATION OF MEDICAL IMAGES

(71) Applicant: nference, Inc., Cambridge, MA (US)

(72) Inventors: Abhijith Chunduru, Bengaluru (IN); Dibakar Saha, Jalpaiguri (IN); Krishna Chaitanya Kaluva, Andhra Pradesh (IN); Suthirth Vaidya, Kerala (IN)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/767,449

(22) Filed: Jul. 9, 2024

Related U.S. Application Data

(60) Provisional application No. 63/516,694, filed on Jul. 31, 2023.

(51) Int. Cl.
  *G06F 21/62* (2013.01)
  *G06V 20/62* (2022.01)

(52) U.S. Cl.
  CPC .......... *G06F 21/6254* (2013.01); *G06V 20/62* (2022.01)

(58) Field of Classification Search
  CPC .......................... G06F 21/6254; G06V 20/62
  See application file for complete search history.

(56) References Cited

U.S. PATENT DOCUMENTS

2008/0240425 A1  10/2008  Rosales
2016/0203264 A1*  7/2016  Danner ................... H04N 1/38
                                                                382/128
2017/0091391 A1   3/2017  LePendu
2018/0068068 A1   3/2018  Bronkalla
2021/0004958 A1   1/2021  Markson et al.
2021/0158936 A1   5/2021  Rao et al.
(Continued)

FOREIGN PATENT DOCUMENTS

IN   202041015864 A   10/2021

OTHER PUBLICATIONS

Monteiro, Eriksson, Carlos Costa, and José Luís Oliveira. "A de-identification pipeline for ultrasound medical images in DICOM format." Journal of medical systems 41.5 (2017): 89. (Year: 2017).*
(Continued)

*Primary Examiner* — Utpal D Shah
(74) *Attorney, Agent, or Firm* — Caldwell Intellectual Property Law

(57) ABSTRACT

An apparatus and method for de-identification of medical images including at least a processor and a memory communicatively connected to the at least a processor, the memory containing instructions configuring the at least a processor to receive a series of images, comprising metadata, and a plurality of image slices; select a sampling strategy as a function of the metadata, wherein the sampling strategy identifies a subset of image slices of the plurality of image slices to sample; apply a text classifier to the subset of image slices, wherein the text classifier is configured to identify a presence of textual information on the subset of image slices; determine at least one relationship between the subset of images slices including providing an output as a function of the presence of the textual information, the metadata, and a position of each image slice.

24 Claims, 18 Drawing Sheets

(56) References Cited

U.S. PATENT DOCUMENTS

| | | | |
|---|---|---|---|
| 2021/0248268 A1 | 8/2021 | Ardhanari et al. | |
| 2021/0366106 A1* | 11/2021 | Yao | G06F 21/6254 |
| 2023/0143593 A1* | 5/2023 | Fuchs | G16H 30/40 |
| | | | 726/27 |
| 2023/0205931 A1* | 6/2023 | Sj?strand | G06F 3/0482 |
| | | | 726/30 |
| 2024/0145068 A1* | 5/2024 | Witschey | G16H 50/70 |

OTHER PUBLICATIONS

A. Shahid et al; A Two-Stage De-Identification Process for Privacy-Preserving Medical Image Analysis; Healthcare (Basel). May 2022; 10(5): 755.
International Search Report; PCTUS2024/038953; Date: Sep. 27, 2024; By: Authorized Officer: Kari Rodriquez.

* cited by examiner

APPARATUS FOR AND METHOD OF DE-IDENTIFICATION OF MEDICAL IMAGES

CROSS-REFERENCE TO RELATED APPLICATIONS

This application claims the benefit of priority of U.S. Provisional Patent Application Ser. No. 63/516,694, filed on Jul. 31, 2023, and titled "SYSTEM FOR AND METHOD OF DE-IDENTIFICATION OF MEDICAL IMAGES," which is incorporated by reference herein in its entirety.

FIELD OF THE INVENTION

The present invention generally relates to the field of image manipulation. In particular, the present invention is directed to an apparatus and method for de-identification of medical images.

BACKGROUND

Artificial intelligence algorithms can be used to extract new insights from data pushing our current understanding in many fields, particularly, medical imaging. However, one step limiting the access to the data for research at scale is the de-identification of the data. Many aspects of patient data, including images, collected by care givers and service providers may be subject to privacy regulations. The usefulness and benefit of processing data collected from patients is clear and acknowledged by the public. However, there is a growing concern of maintaining the privacy of user data, particularly when the data can be used to identify the patient. Such concerns are the basis of HIPAA (Health Insurance Portability and Accountability Act) regulations initially passed in 1996 by the US Congress. Many other countries have also promulgated similar regulations and legislations. In addition to HIPAA, many other regulations have been enacted in various jurisdictions, such as GDPR (General Data Protection Regulations) in the European Union, PSD2 (Revised Payment Services Directive), CCPA (California Consumer Privacy Act 2018), etc. Generally, HIPAA and other regulations limit the release of personal information that may result in identification of members of the public or details of their physical attributes or biometric data. Current systems utilized for de-identification require large amounts of processing power and cannot provide for de-identification in a quick or efficient manner.

SUMMARY OF THE DISCLOSURE

In an aspect an apparatus for de-identification of medical images is described. The apparatus includes at least a processor and a memory communicatively connected to the at least a processor. The memory contains instructions configuring the at least a processor to receive a series of images, the series of images comprising metadata and a plurality of image slices, select a sampling strategy as a function of the metadata, wherein the sampling strategy identifies a subset of image slices of the plurality of image slices to sample, apply a text classifier to the subset of image slices identified by the sampling strategy, wherein the text classifier is configured to identify a presence of textual information on the subset of image slices, determine at least one relationship between the subset of images slices including providing an output as a function of the presence of the textual information, the metadata, and a position of each image slice of the subset of image slices in the series of image slices, wherein the output indicates whether to mask all image slices of the plurality of image slices and mask one or more image slices of the plurality of images slices as a function of the textual information and at least the output.

In another aspect, a method for de-identification of medical images is described. The method includes receiving, by at least a processor, a series of images, the series of images comprising metadata and a plurality of image slices, selecting, by the at least a processor, a sampling strategy as a function of the metadata, wherein the sampling strategy identifies a subset of image slices of the plurality of image slices to sample, applying, by the at least a processor, a text classifier to the subset of image slices identified by the sampling strategy, wherein the text classifier is configured to identify a presence of textual information on the subset of image slices, determining, by the at least a processor, at least one relationship between the subset of images slices including providing an output as a function of the presence of the textual information, the metadata, and a position of each image slice of the subset of image slices in the series of image slices, wherein the output indicates whether to mask all image slices of the plurality of image slices and masking, by the at least a processor, one or more image slices of the plurality of images slices as a function of the textual information and at least the output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
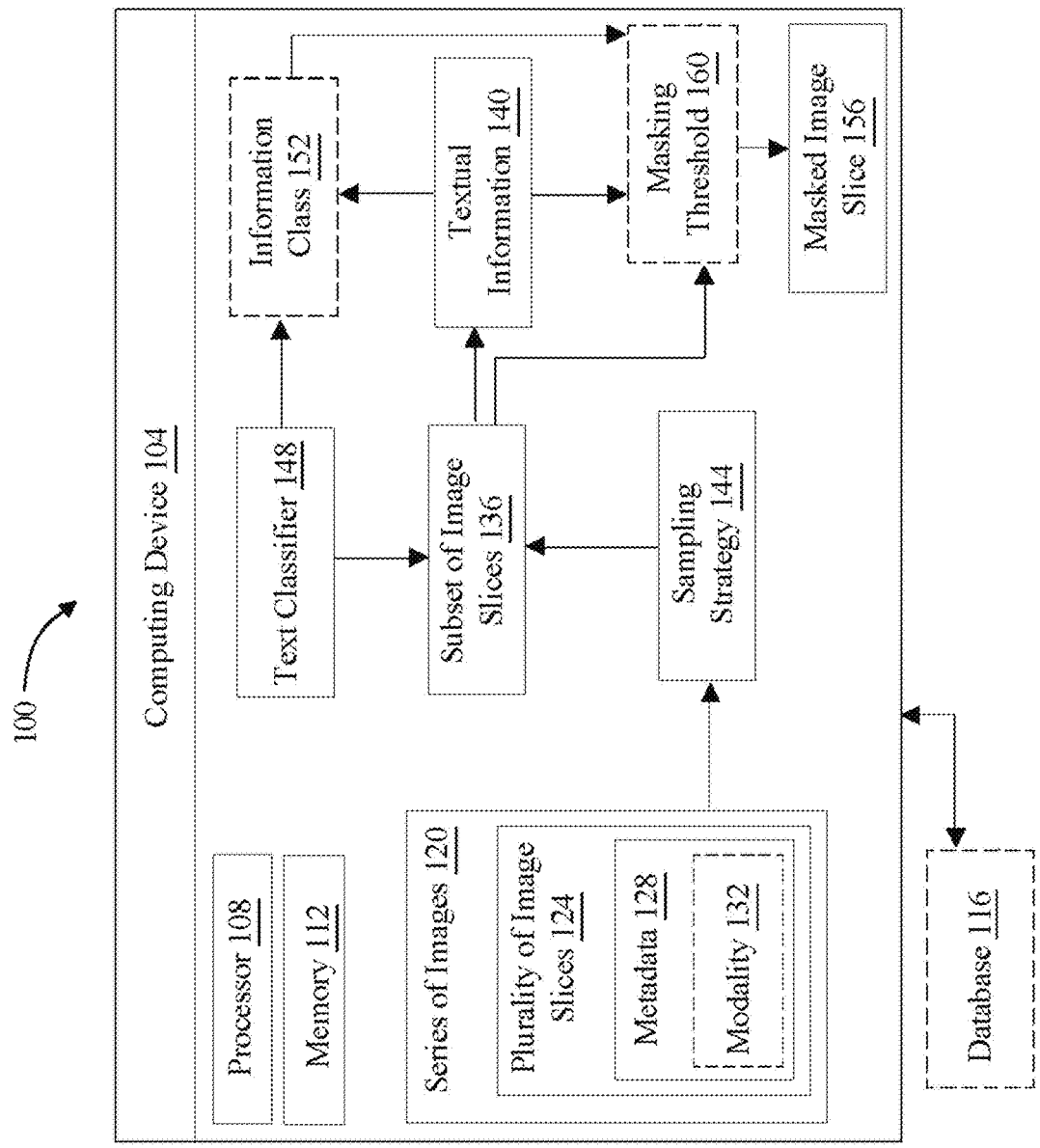
FIG. 1 is an exemplary embodiment of an apparatus for de-identification of medical documents.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

De-Identification of medical image data can include algorithms to locate text in images, check for PII (Patient Identifying Information) and mask them or replace them with synthetic data. This process can also be resource intensive and inefficient if done naively, for example, if algorithms are applied to each image or to each slice in an image stack. The methods and systems disclosed herein provide fast de-identification of medical image data at scale and meet the performance targets for PII leakage. The methods and systems disclosed herein can perform de-identification at scale within a reasonable time. For example, analysis of medical image data may involve a large volume of data, e.g., petabytes, and many de-identification methods do not scale for this volume. Therefore, algorithms must be developed to quickly de-identify data by (1) identifying PII and (2) removing or masking PII.

Processes for de-identification require that words, phrases, or numbers that are flagged as Patient Health Information ("PHI") are removed or replaced by non-identifiable placeholders that do not place patient privacy or confidentiality at risk. An example of these requirements are those outlined in the Safe Harbor Method defined by the United States HIPAA Privacy Rule, section 164.514, incorporated herein by reference in its entirety, which specifies eighteen categories of PHI identifiers that must be masked. The Safe Harbor Method also includes associated guidelines, also incorporated herein by reference in its entirety, to inform operators on how best to implement the requirements contained in the Privacy Rule for the de-identification of health information. Although discussions of some embodiments below are directed to patient data typically masked in accordance with the Safe Harbor Method, the systems and methods described herein may equally apply to data records beyond these embodiments. Large scale masking of entities revealing sensitive information is not limited to healthcare applications. For example, the release of documents containing sensitive information by any government agency has the same problem to grapple with even though it is often solved in practice by human curation at small scales.

De-identification includes removing Patient Identifiers (PII) from an image, whether they are found in the image data (e.g., pixel data) or in the metadata for the image. In some embodiments, the methods and systems disclosed herein relate to de-identification of a series or stack of DICOM images. DICOM is a standard for storage and representation of medical images. DICOM images are different from other images because they contain both image pixel data (e.g., a plurality of image slices) and metadata. A DICOM can include a plurality of slices, each with image pixel data, and metadata. For example, a DICOM image can include a header with metadata. The methods and systems disclosed herein relate to de-identifying PII from image data and is agnostic to any heuristic for de-identifying the DICOM headers. For example, the methods and systems disclosed herein can be combined with any method for de-identifying DICOM headers or other metadata associated with an image series.

Furthermore, the systems and methods disclosed herein are not limited to DICOM images. The systems and methods disclosed herein can be used to de-identify any image series or stack that includes a plurality of image slices and associated metadata. Each slice in a series is a two-dimensional image or image file, for example, each slice representing a different time point or a cross-section of a three-dimensional image. For example, such a series can be created by splitting DICOM images into a header file and image files (e.g., saved in any format, including but not limited to, JPEG, PNG, TIFF, BMP, Nifti, Mhd, raw, Numpy, HDF5).

The systems and methods disclosed herein can be used to de-identify images series created using any modality. In some embodiments, an image series or stack can include a time series where each image slice represents a different time point (e.g., frames of a video). In some embodiments, an image series or stack can include cross-sections from a three-dimensional image. Non-limiting examples of modalities include computed tomography (CT), magnetic resonance (MR) and positron emission tomography (PET), echo cardiogram, ultrasound sonography, x-ray fluoroscopy, and Endoscopy.

In some embodiments, a series of images can be de-identified using image-level classification method (e.g., a text classifier) for the presence of text in image data (e.g., within the pixel data of one or more image slices). In some embodiments, an image series includes a plurality of image slices, each of which may or may not include text. A text classifier can determine whether or not text is present in the pixel data of an image slice. For example, text classifier can provide a classification of "text" or "no text" for each slice of an image series or subset of an image series. For example, a text classifier can operate on one or more image slices or on a portion of one or more slices. In some embodiments, the presence of text can be identified by analyzing images slices using text classifier that includes a neural network. In some embodiments, a text classifier can include a neural network combined with a support vector machine, a random forest, or combinations thereof. In these embodiments, a pretrained neural network can extract features from pixel data and another classifier (e.g., a support vector machine or a random forest) can use those features or other output to perform classification.

If a text classifier or neural network were to check every slice for the presence of text, de-identification methods would be inefficient and would not scale for large volumes of data.

Furthermore, localizing text in a slice and masking only the area where text is located can also be inefficient. Instead, the methods and systems disclosed herein can de-identify image series more efficiently by sampling a subset of slices in an image series for the presence of text.

In some embodiments, the methods and systems disclosed herein include sampling a subset of slices for the presence of text and determining whether to mask or remove (1) the entire image series, (2) a subset of the image series, or (3) none of the image series. For example, for an image series of a particular modality or from a particular manufacturer, only a particular subset of slices is likely to include text, and de-identification can be performed more efficiently by sampling only a subset of an image series that is likely to include text or other PII. In some embodiments, the methods and systems disclosed herein provide additional efficiency by masking slices in their entirety (e.g., masking all slices of the image series) if they contain text, rather than using a text localization method to mask only the area of a slice where text is located. Although the methods and systems disclosed herein cannot be used for all image series, (for example, a more complicated or computationally intensive method may be appropriate for a head series where the image includes PII such as a patient's facial features) these methods and systems can be used for many image series without a need for computationally intensive methods. For example, the methods and systems disclosed herein can be used in at least one or more of the following examples, (1) where the presence of text in image slices can be predicted based on modality or manufacturer, (2) where the number of slices that include text is small, and (3) where slices that include text can be removed or masked without losing image data of interest.

In some embodiments, a sampling strategy or sampling heuristic is developed to include a sufficient number of slices to accurately identify and mask slices that contain text, without sacrificing efficiency gained by sampling a subset of slices. For example, during development of the sampling strategy, slices likely to contain text are sampled but slices that are unlikely to contain text are not selected. In this way, the number and position of slices sampled can be optimized to identify slices likely to contain text so that only a small number of slices is sampled. In another example, image metadata or DICOM tags can be used to select the number of slices sampled. In some embodiments, efficiency can be assessed based on the number of computer-hours (GPU/CPU) used for de-identification of an image series (e.g., a dataset of DICOM images).

In some embodiments, large data sets (e.g., from a particular modality, manufacturer, or combination thereof) can be analyzed to develop a sampling strategy (e.g., for from a particular modality, manufacturer, or combination thereof). In some embodiments, a sampling strategy can be developed based on modality, manufacturer, tags related to secondary capture (e.g., secondary capture manufacturer, date of secondary capture), or combinations thereof. For example, some manufacturers may include text only in the first few slices of an image series, and therefore it would be efficient to sample only those slices. In some embodiments, by analyzing large data sets, patterns can be identified and exploited to develop a sampling strategy or heuristic that improves computational efficiency, for example, by sampling slices that are likely to include text. In some embodiments, a sampling strategy can be developed by analyzing a large dataset. For example, a sampling strategy is developed by analyzing a large dataset using a text classifier. To develop a sampling strategy, random or focused subsets of the dataset can be analyzed. For example, an automated script can be used to inspect data characteristics, e.g., checking for color or images with multiple series. In some embodiments, a sampling strategy can also be dependent on the performance of the text classifier. For example, if a text classifier performs poorly on certain parts of the data, the sampling strategy can sample more slices in those parts to compensate for the drop in performance. In some embodiments, a text classifier performs poorly for certain types of data, and this poor performance can be addressed by sampling more image slices and aggregating the outputs of the text classifier for those image slices.

Once a sampling strategy has been developed for a modality, manufacturer, or combination thereof, that sampling strategy can be selected based on metadata for an image series. For example, when an image series is received, the header or other metadata can be read to identify the modality or manufacturer, and that information can be used to select a sampling strategy. For example, for each image modality or manufacturer, a heuristic or sampling strategy can be applied based on the expected patterns of text presence for that particular modality or manufacturer. A heuristic or sampling strategy can include two components. First, a sampling strategy based on the metadata to sample a subset of images for analysis by a text classifier (e.g., a neural network). Second, a heuristic to determine which slices to mask based on the output of the text classifier and the metadata.

In some embodiments, the sampling strategy can use a probability vector selected based on metadata (e.g., DICOM headers). A probability vector can include, for each slice, a probability that a given slice needs to be sampled. For example, this probability can be determined based on the prevalence of text in a given slice from a dataset used to develop the sampling strategy. The probability for each slice can be determined based on analysis of a particular modality or manufacturer or based on metadata (e.g., DICOM tags) when developing a sampling strategy. A probability vector can be used to sample a set of image slices for classification by the text classifier (e.g., a neural network). For example, if a probability vector includes a probability of sampling for each slice, that probability vector can be used to determine whether that slice is sampled.

In some embodiments, after sampling a set of images and applying a text classifier or neural network to each slice, for each slice, one or more flags or outputs can be set by the heuristic based on the output of the text classifier/neural network (e.g., a first output) and the metadata, including 1) Whether to mask all slices in the series (e.g., a second output) or 2) Whether to mask the particular slice (e.g., a third output). Any heuristic can be used to determine whether to mask all slices or whether to mask a particular slice. In some embodiments, a neural network can determine whether to mask all slices or whether to mask a particular slice. In some embodiments, a neural network is used as a text classifier to indicate whether each slice includes text, while a simpler heuristic (e.g., logic) is used to indicate whether to mask all slices or whether to mask a particular slice. For example, a first output for a slice can be set to 1 if that slice has text. For example, a second output can be set to 1 if a minimum of three sampled slices have text (e.g., if the first output for those slices is 1). For example, a third output for a slice can be set to 1 if that slice and its neighboring slices have text.

In some embodiments, a heuristic will provide an output or flag (e.g., a second output) indicating whether all slices should be masked (e.g., based on previous analysis of sets of images from the same modality manufacturer). An output or flag indicating whether all slices should be masked can be based on the text classifier's output (e.g., a first output) for that image slice, the metadata, a position of that image slice in the image series, or a combination thereof.

In some embodiments, a flag or second output will indicate that all slices should be masked if the image series is a secondary capture. In these embodiments, a secondary capture series often contains text on all slices. In some embodiments, a flag will indicate that all slices should be masked if a large number of sampled slices contain text (e.g., 90% of sampled slices contain text).

In some embodiments, the threshold for masking all slices may be determined based on the metadata. In these embodiments, presence of text in a large number of sampled slices can indicate that there is likely text in all slices. For example, a threshold can be set such that if the number of sampled slices containing text exceeds the threshold, all samples should be masked. In some embodiments, a flag will indicate that all slices should be masked if the image series is a head study. In these embodiments, if a series is a head study, the entire series should be masked because the pixel data itself may be PII. In some embodiments, a flag will indicate that all slices should be masked if the image series is not an axial series. In some embodiments, the threshold for masking all slices may be based on modality. For example, in some modalities. Text may be expected within the first few slices; for example, a CT scan modality. In this case, if text is detected outside of those first few slices (i.e. where text is unexpected) then second output may be set to 1, such that all slides are masked. In some embodiments, this may serve as an escalation mechanism. As a non-limiting example, the outputs of text classifier 140 may serve to trigger an escalation mechanism. For example, if text is found in a slice where text was not expected (based on modality, metadata, or the like), then all slices may be masked in order to safeguard patient privacy. In some embodiments, escalation mechanism may trigger further analysis, such as additional slices to be chosen as samples.

In some embodiments, a heuristic will provide an output or flag (e.g., a third output) indicating that a particular slice should be masked based on the metadata (e.g., based on previous analysis of sets of images from the same modality manufacturer). An output or flag indicating whether a particular slice should be masked can be based on the text classifier's output for that image slice, the metadata, a position of that image slice in the image series, or a combination thereof. In some embodiments, a flag will indicate that a particular slice should be masked if that slice includes text. In some embodiments, a flag will indicate that a particular slice should be masked if that slice is within a fixed number of slices k from a slice in the image series that a heuristic has determined should be masked or if the slice is at a position in the series that a heuristic has determined should be masked. In these embodiments, the heuristic may have determined that it is safe to mask a subset of slices, e.g., the first k slices of the series. The flag for a slice can depend on the text classifier's output for that slice or the text classifier's output for other slices as well. In some embodiments, the images for the modality can be de-identified or masked partly based on the above-mentioned flags. In some embodiments, an entire slice can be masked if the slice includes text.

In some embodiments, a sampling strategy can identify a subset of slices in an image series to sample based on metadata for the image series. In some embodiments, the subset of slices identified by the sampling strategy includes the first slice of the series. In some embodiments, the subset of slices identified by the sampling strategy includes the last slice of the series. In some embodiments, the subset of slices identified by the sampling strategy includes a number of slices determined by the efficiency tradeoff for the dataset. In some embodiments, the number of slices is large enough for accurate identification of slices that have text. In some embodiments the number of slices is small enough to avoid slowing the method. In some embodiments, the number of slices to be sampled depends on the metadata of the image series.

In some embodiments, the number of slices to be sampled depends on a heuristic on the metadata of the series. For example, in some embodiments, the number of slices in a subset can vary from series to series within an embodiment. In these embodiments, a heuristic can read the metadata of the image series and estimate the number of slices to be sampled. In some examples, the subset of slices includes about 6 or 10 slices or any number of slices between 6 and 10. In any of these embodiments, the number of slices in the subset is selected to be small enough to provide efficiency gains while also being large enough to sample all slices likely to have text. In some embodiments, a subset includes all slices in image series, e.g., for certain combinations of metadata. In some embodiments, the subset of slices selected by the sampling strategy includes one or more slices between the first and last slices. In some embodiments, the sampling strategy identifies one or more slices at random positions between the first and last slices. In some embodiments, the sampling strategy identifies one or more slices at fixed intervals between the first and last slices, for example identifying one slice every j slices. A sampling strategy can include any combination of sampling strategies disclosed herein, for example, a combination of one or more of a subset of slices including the first slice, a subset of slices including the last slice, and a subset of slices between the first slice and the last slice. In some embodiments, the sampling strategy heuristic (e.g. logic) can be codified for each series as a probability vector based upon which the sampling can take place.

In some embodiments, after sampling a subset of slices, one or more slices can be masked. For example, one or more slices containing text can be masked. In some embodiments, a slice can be masked in its entirety, for example by masking all pixels of the slice. In some embodiments, a slice can be masked by removing that slice from the image series. In some embodiments, a slice can be masked by assigning all pixels of the slice the same intensity value, e.g., the minimum intensity value or the maximum intensity value. In some embodiments, a slice can be masked by blanking out the entire slice. In some embodiments, a slice can be masked by blanking out the entire slice and displaying a message. In some embodiments, a slice can be masked by blurring the slice. In some embodiments, a portion of a slice can be masked, for example, by assigning a portion of pixels in the slice the same intensity value, by blanking out a portion of the slice, or by blurring a portion of the slice. In some embodiments, a slice can be masked by in-painting the slice with similar looking dummy values.

In some embodiments, the methods and systems disclosed herein include de-identifying or masking PII located in the metadata or header of an image series. PII located in metadata can be in the form of text. Non-limiting examples of PII that can be found in headers or metadata or headers include name, age, gender, address (e.g., institution address, personal address, or country of residence), dates (e.g., image acquisition data, creation date, birth date), unique identifiers (e.g., accession number, admission id, patient id), acquisition device details, phone numbers, study details, comments, and combinations thereof. Any known methods can be used to de-identify or mask the metadata or header. For example, U.S. application Ser. No. 16/908,520, the contents of which are incorporated by reference, describes illustrative methods of masking PII in text. For example, masking the information in a text sequence can include replacing one or more tagged entities or term with a placeholder marking a type of entity or term. In another example, masking the information in a text sequence can include changing a value of one or more tagged entities to a randomized value. In some embodiments, PII can be replaced by random data, e.g., replacing social security numbers by random digits. Such techniques may be used in structured datasets. For example, a structured dataset including names, social security number and heart rate of patients can be anonymized by de-identifying the values of the attributes "name" and "social security number." In some embodiments, dates, times and names can be replaced with mock values. In some embodiments, identifiers can be replaced with mock hashed values. In some embodiments, PII can be removed without being replaced.

Referring now to FIG. 1, an apparatus 100 de-identification of medical documents is described. Apparatus 100 includes a computing device 104. Apparatus 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register may be configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU may be configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, apparatus 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, processor 108 is configured to receive a series of images 120. In one or more embodiments, series of images 120 may include any images as described in this disclosure. In one or more embodiments, series of images 120 may include images that are correlated to one another. For example, and without limitation, series of images 120 may include images taken in consecutive order, images scanned in consecutive order, image associated with an individual, images taken within a particular time frame and the like. In one or more embodiments, series of images 120 may include images contained within a single file, wherein the single file may contain multiple images. In one or more embodiments, series of images 120 may include frames extracted from a video wherein each image in series of images 120 contains a particular frame within the video. In one or more embodiments, series of images 120 may include images taken during a medical examination, such as but not limited to X-rays, CT scans, MRI scans and the like.

With continued reference to FIG. 1, series of images 120 may include a plurality of images slices. An "image slice" for the purposes of this disclosure refers to a singular frame or image within series of images 120. In one or more embodiments, image slice may refer to a particular frame in a video, a different point in time of a video, a particular image in series of images 120 and the like. In one or more embodiments, series of images 120 may include plurality of image slices 124 wherein series of images 120 may include multiple captured frames of a video, multiple photos associated with a medical examination and the like. In one or more embodiments, series of images 120 may include DICOM images. In one or more embodiments, DICOM (Digital Imaging and communications in medicine) images may include a standard format used for storing and transmitting medical images. In one or more embodiments, DICOM images may include medical images such as, but not limited to, X-rays, MRIs, CT scans and the like. In one or more embodiments, DICOM images may include metadata 128 such as but not limited to, information about the patients, imaging equipment used, and/or any other metadata 128 as described in this disclosure. In one or more embodiments, DICOM images may include image slices wherein each image slice may represent a cross-sectional view of a patient's anatomy. In one or more embodiments, DICOM images may include a stack of image slices wherein the stack corresponds to a 3D representation of the imaged anatomy. In one or more embodiments, the 3D presentation may allow medical professionals to view a 3D representation of a patient's anatomy. In one or more embodiments, series of images 120 may include a plurality of images slices 124 wherein each image slice may be associated with an image or slice of an overall 3D representation.

With continued reference to FIG. 1, series of images 120 may include metadata 128. "Metadata" for the purposes of this disclosure is data that provides information about other data. In some embodiments, metadata may be associated with each image slice and/or associated with series of images 120. For example, and without limitation, metadata 128 may include information such as the date and time in which image slice was captured, the source of the capture (e.g. the type of camera used), where the image slice belongs in series of images 120, recent modifications made to image slice, the field format and the like. In one or more embodiments, metadata 128 may include any metadata 128 as described in this disclosure. In one or more embodiments, metadata 128 may include a modality 132 of image slice. A "modality" for the purposes of this disclosure refers to the specific imaging technique or method used to acquire image slides. For example, and without limitation, modality 132 may include various types of imaging technologies, such as computed tomography (CT), magnetic resonance imaging (MRI), positron emission tomography (PET), ultrasound, and X-ray. In one or more embodiments, each modality 132 may contain its own unique characteristics and uses different principles to generate images of the human body. In one or more embodiments, metadata 128 may include a modality 132 wherein the modality 132 indicates the particular imaging used to generate image slices, the particular camera used and the like. In one or more embodiments, modality 132 may indicate the source of image slices. For example, and without limitation, modality 132 may indicate the source of the image was an MRI machine. In one or more embodiments, the source of image slice may provide information associated with image slices, such as for example, the type of information that may be contained within image slices. For example, and without limitation, a modality 132 indicating a CT scan may indicate that series of images 120 contain X-rays of a patient's head. In one or more embodiments, the source of image slices may indicate the type of information that may be contained therein. In one or more embodiments, modality 132 may include the manufacturer of the imaging device used. For example, and without limitation, metadata 128 may indicate that the imaging device used was a Toshiba CT scan machine. In one or more embodiments, metadata 128 may include information indicating that placement of an image slice within series of images 120. For example, and without limitation, metadata 128 may indicate that image slice is $5^{th}$ within a series of 20 images. In one or more embodiments, metadata 128 may indicate if two image slices within series of images 120 contain similar information. For example and without limitation, metadata 128 may indicate if two images slices contain the same CT scan but taken at different angles.

With continued reference to FIG. 1, processor 108 may be configured to select a subset of image slices 136. A "subset of image slices" for the purposes of this disclosure refers to one or more selected image slices within plurality of image slices 124. For example, example and without limitation, subset of image slices 136 may include the first ten image slices within series of images 120, the first and/or last image slice within series of images 120, a consecutive set of image slices within series of images 120, a random selection of image slices within series of image slices 120 and the like. In one or more embodiments subset of image slices 136 may include any portion of series of images 120. In one or more embodiments, subset of image slices 136 may include any subset of image slices 136 as described in this disclosure.

With continued reference to FIG. 1, subset of image slices 136 may include image slices are determined to possibly contain textual information 140. "Textual information" for the purposes is any information that is presented in a written or typed form. For example, and without limitation, textual information 140 may include a name, a phrase, a word, a combination of numbers and alphabetic characters and the like. In one or more embodiments, textual information 140 on image slices may indicate information associated with the image slices, such as but not limited to, the name of the individual in which the image slices are associated with, a date, a location at which the image slices were generated and the like. In one or more embodiments, image slices may include medical reports wherein textual information 140 may include a diagnosis, treatment, the patient's concerns, the physicians' findings and the like. In one or more embodiments, textual information 140 may include personally identifiable information. "Personally identifiable information or "PII" for the purposes of this disclosure is any information that may be used to identify an individual associated with the information. For example, and without limitation, PII may include a name, a social security number, an address, a phone number, a date of birth, a height, a weight and the like. In one or more embodiments, PII may be used to identify a patient using information contained within series of images 120. In one or more embodiments, textual information 140 may include PII wherein textual information 140 may include unique identifiers used to identify an individual and the like. In one or more embodiments, PII may further include visual information, wherein visual information may include photos, scans and/or any other information within a visual or graphical format.

With continued reference to FIG. 1, processor 108 may be configured to identify subset of image slices 136. In one or more embodiments, subset of image slices 136 may be identified in any way as described in this disclosure. In one or more embodiments, processor 108 may be configured to identify subset of image slices 136 by selecting image slices from plurality of images slices. In one or more embodiments, subset of image slices 136 may include image slices selected by processor 108. In one or more embodiments, processor 108 may select image slices for use in subset of image slices 136 by determining which image slices are most likely to contain textual information 140. In an embodiment, processor 108 may identify subset of image slices 136 by selecting image slices that have been determined to have the highest probability of containing textual information 140. In one or more embodiments, processor 108 may be configured to select images slices for subset of image slices 136 as a function of a sampling strategy 144. A "sampling strategy" for the purposes of this disclosure is a set of rules or algorithms that are used to determine which image slices within plurality of image slices 124 have the highest probability of containing textual information 140. For example and without limitation, sampling strategy 144 may include a rule in which image slices that are received from a CT machine (as indicated within metadata 128) will have the highest probability of containing textual information 140 in the first 5 image slices within plurality of image slices 124. In another non limiting example, sampling strategy 144 may contain a rule in which the last image slice within plurality of image slices 124 may contain textual information 140, wherein processor 108 may select the last image slice within series of images 120 for user in subset of image slices 136. In one or more embodiments, sampling strategy 144 may include a rule and/or algorithm for each set of information within metadata 128. For example, and without limitation, sampling strategy 144 may include rules in which particular image slices are selected based on the manufacturer of the imaging device, the modality 132 and the like. In one or more embodiments, selecting the sampling strategy 144 as a function of metadata 128 may include identifying modality 132 within metadata 128. In one or more embodiments, each modality 132 may indicate a differing sampling strategy 144. For example, and without limitation, use of a first modality 132 may result in textual information 140 presented on a first image wherein sampling strategy 144 may include selecting a first image, whereas use of a second modality 132 may cause textual information 140 to be present on a last image wherein sampling strategy 144 may include selecting the last image. In one or more embodiments, sampling strategy 144 may include any sampling strategies 144 as described herein. In one or more embodiments, sampling strategy 144 may include selectin image slices at random within plurality of image slices 124. In one or more embodiments, sampling strategy 144 may include selecting a first image slices and/or a last image slice within plurality of image slices 124. In one or more embodiments, sampling strategy 144 may include selecting image slices based on metadata 128. In one or more embodiments, sampling strategy 144 may include selecting image slices based on a source of series. For example, and without limitation, a physician and/or entity responsible for and/or associated with creating series of images 120 may be known for placing textual information 140 on the top of each image slice, on a particular portion of each image slice, within a first image slice, within a last image slice and the like. In one or more embodiments, a plurality of sampling strategies 144 may exist wherein sampling strategies 144 may be selected based on metadata 128, the amount of image slices and the like. In one or more embodiments, sampling strategy 144 may be selected based on the size ratio of image slices as indicated within metadata 128. For example, and without limitation, image slices containing a size ratio of 8.5×11 may be determined to have a higher probability of textual information 140 since the size ratio of the image slices may be similar to that of word documents. Similarly, subset of image slices 136 may be determined based on size ratios of image slices wherein size ratios most closely resembling those of documents may be selected. In one or more embodiments, sampling strategies 144 may include selecting image slices at random, selecting image slices based on image file size, selecting image slices based on contrast ratios, color within the image and the like. In one or more embodiments, sampling strategies 144 may include selecting image slices based on predetermined patterns such as, for example, every other image slice in series of images 120, every other two image slices in series of images 120 and the like.

With continued reference to FIG. 1, sampling strategy 144 may be used to generate subset of image slices 136. In one or more embodiments, subset of image slices 136 may include any image slices within plurality of image slices 124. In one or more embodiments, subset of image slices 136 may include at least a first image within plurality of image slices 124. In one or more embodiments, at least a first image may include a first image within a sequential order of image slices. In one or more embodiments, at least a first image may include a first image within a stack of images, a first image in a document having multiple image, a first image taken during a sequence of events, a first image taken during examination and the like. In one or more embodiments, subset of image slices 136 may further include at least a last image in plurality of image slices 124. In one or more embodiments, at least last image may include a last image within a series of sequential images, a final image taken during examination and the like.

With continued reference to FIG. 1, processor 108 may be configured to identify a presence of textual information 140 within subset of image slices 136. In one or more embodiments, processor 108 may be configured to identify textual information 140 such as a name, page number, address, type of examination being performed (if any), a date, description of the image slice, and the like. In one or more embodiments, only image slices selected within subset of image slices 136 may be selected for identification of textual information 140. In one or more embodiments, processor 108 may utilize an OCR reader to recognize textual information 140.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. A line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 10-12. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 10-12.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in one or more embodiments, processor 108 may utilize OCR to recognize textual information 140 within subset of image slices 136. In one or more embodiments, processor 108 may utilize a text classifier 148 to identify textual information 140 within subset of image slices 136. In one or more embodiments, text classifier 148 may be configured to receive an input such as image slices and output textual information 140 contained within image slices. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like.

With continued reference to FIG. 1, processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, text classifier 148 may include an image classifier. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 104 and/or another device may generate image classifier and/or text classifier 148 using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, processor 108 may use an image classifier to identify a key image in data described in any data described in this disclosure. As used herein, a "key image" is an element of visual data used to identify and/or match elements to each other. For example, and without limitation, key image may include an image of manufactured part and/or manufactured part feature. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data (e.g., image slices) described in this disclosure and output a key image and/or textual information 140 within the data. In some cases, image classifier may identify one or more words and/or alphanumeric characters. In one or more embodiments, image classifier may be configured to detect words and/or phrases within image slices. In one or more embodiments, an OCR process may be utilized in instances in which words and/or phrases are added to image during post processing while image classifier may be configured to identify text within images. In one or more embodiment, image classifier may be further configured to identify various physical features of individuals, such as for example, facial features, fingerprints and/or any other personally identifiable information. In one or more embodiments, image classifier may be configured to identify both textual information 140 and images/portions of an image that may contain personally identifiable information.

In one or more embodiments, text classifier 148 may be configured to identify textual information 140 within image slices. In one or more embodiments, text classifier 148 may be trained using training data containing a plurality of images containing text correlated to a plurality of text in a textual format. In one or more embodiments, text classifier 148 may be trained to identify text within images. In one or more embodiments, text classifier 148 may include a classifier machine learning model trained with classifier training data. In one or more embodiments, classifier training data may include a plurality of images with text correlated to a plurality of textual information 140. In one or more embodiments, classifier training data and/or any training data as described in this disclosure may be generated by a user of apparatus 100, a third party and/or the like. In one or more embodiments, classifier machine learning model may be iteratively trained to identify textual information 140 within image slices. In one or more embodiments, a user may provide feedback to classifier machine learning model by selecting portions and/or highlighting portions of image slices that contain textual information 140 which have not been identified by text classifier 148 and/or classifier machine learning model.

With continued reference to FIG. 1, text classifier 148 may be configured to classify textual information 140 to information classes 152. An "information class" for the purposes of this disclosure is a grouping of data having similar characteristics or attributes. For example and without limitation, an information class 152 may include names wherein names identified within textual information 140 may be classified to an information class 152 for names. In one or more embodiments, information classes 152 may include groupings such as but not limited to, names, dates, addresses, the particular medical examination provided, treatments, patient diagnoses, social security numbers, the entity providing treatment and the like. In an embodiment, textual information 140 may be classified to information classes 152 to understand the type of information that has been extracted from image slices. For example, and without limitation, textual information 140 classified only to a page number class may indicate that the only information present on the image slices was a page number. Similarly, textual information 140 classified to both a name class and a page number class may indicate that both a name and a page number were extracted from the image slice. In one or more embodiments, text classifier 148 may be configured to classify information to information classes 152. In one or more embodiments, text classifier 148 may be trained on a plurality of training data correlating textual information 140 to information classes 152. In an embodiment, training data may be used to train text classifier 148 to receive textual information 140 as inputs and output information classes 152. In an embodiment, information classes 152 may be used to distinguish between PII and descriptive information on an image slice. In an embodiment, text classifier 148 may be used to identify personally identifiable information such as but not limited to, names, phone numbers, social security numbers and the like. In one or more embodiments, text classifier 148 may include any text classifier 148 as described in this disclosure.

With continued reference to FIG. 1, processor 108 is configured to determine relationships between image slices within subset of image slices 136. "Determining a relationship between image slices" as described herein refers to identifying commonalities between image slices. For example and without limitation, determining a relationship may include determining if subset of images slices contain image slices within a sequence. Continuing, the sequence may include the fourth image slice, the fifth image slice and the sixth image slice within plurality of image slides. In another non limiting example, a relationship may include identification of similar information on each image slice within subset of image slices 136, wherein image slices may contain similar textual information 140 such as names, addresses unique identifiers and the like. In one or more embodiments, relationships between image slices may include but are not limited to, whether images are in a particular sequence, whether image slices contain similar textual information 140, whether image slices are the same size, whether image slices, the textual information 140 in the same section of each image slice and the like. In one or more embodiments, determining relationship may include determining if any and/or image slices contain textual information 140. In one or more embodiments, determining a relationship may include determining if one or more image slices contain text, if one or more image slices originate from a similar entity, if one or more image slices utilize a similar modality 132 (as indicated within metadata 128) and the like. In one or more embodiments, relationship may include determining a consecutive order status of image slices. A "consecutive order status" for the purposes of this disclosure is a determination of whether subset of image slices include image slices that follow one another in an uninterrupted order. For example and without limitation, plurality of image slices 124 may contain a particular order of image slices wherein image slices in an uninterrupted order may be in consecutive order. In one or more embodiments, image slices may be labeled based on their position within plurality of image slices 124 wherein labels indicating that image slices are consecutive to one another may indicate that the image slices are in consecutive order. For example and without limitation, in a set of 10 image slices, image slices may be labeled from 1-10 depending on their order. Continuing, image slices having labels 4, 5 and 6 may be in consecutive order while image slices having labels 3, 5 and 8 may not be in consecutive order. In one or more embodiments, image slices may be in consecutive order wherein consecutive order may indicate the timing in which each image slice was recorded. In one or more embodiments, consecutive order status may indicate if subset of image slices contain image slices that are in consecutive order within plurality of image slices 124 and/or within series of image slices 120. In one or more embodiments, processor 108 may determine if subset of image slices 136 contains one or more image slices within a consecutive order in order to determine consecutive order status. In one or more embodiments, image slices may be in consecutive order if they precede each other. For example, and without limitation, two consecutive frames in a video may be in consecutive order. In one or more embodiments, image slices may be in consecutive order if they directly precede one another. In one or more embodiments, metadata 128 may indicate the relative position of image slices within plurality of image slices 124 wherein two image slices may be in consecutive order if metadata 128 indicates that the image slices directly precede one another. In one or more embodiments, processor 108 may determine relationships between image slices by determining if two or more images slices are in consecutive order. In one or more embodiments, determining a relationship may include a process of providing a second output (also referred to as "output") and/or a process of providing a third output (also referred to as "additional output" as described in further detail below). In one or more embodiments, determining a relationship may include determining if multiple image slices contain the same amount of textual information 140 on each image slice. In one or more embodiments, determining at least one relationship between the subset of images slices includes providing a second output as a function of the presence of the textual information, the metadata, and a position of each image slice of the subset of image slices in the series of image slices, wherein the second output indicates whether to mask all image slices in the plurality of image slices and providing a third output as a function of the presence of textual information, the metadata, and the position of each image slice of the subset of image slices in the series of image slices, wherein the third output indicates whether to mask each image slice. In one or more embodiments, determining a relationship may further include determining a relative placement of each image slice within subset of image slices 136, such as for example, determining if image slice is first within an order of image slices, determining if image slice is last in an order and the like.

With continued reference to FIG. 1, determining a relationship between image slices within subset of image slices 136 may include determining a secondary capture status of image slices within subset of image slices 136. A "secondary capture status," for the purposes of this disclosure, is information indicating whether an image slice contains an image that has been rescanned, recaptured, or rephotographed. For example, and without limitation, an image slice may contain a scanned image of a physical print of an X-ray wherein the scanned image may contain notes and/or other information of the physical print. In one or more embodiments, a secondary capture may include images that have been scanned and placed within word documents. In one or more embodiments, electronic health records may contain textual information 140 with image slices used as reference. In one or more embodiments, secondary captures may be used in instances in which physician notes are written and images within the notes are used as reference. In one or more embodiments, image slices may be secondary capture wherein annotations and/or notes may be made on the image directly. In one or more embodiments, secondary capture status may be determined based on the size of the image in connection to the overall size of image slice. For example, and without limitation, image slice may contain an image in only a portion of image slice. In one or more embodiments, secondary capture status may be determined based on the presence of borders within an image, the presence of a white background (indicating the image is placed within a word document), the presence of textual information 140 contained within a white background, the presence of multiple images on a single image slice and the like. In one or more embodiments, secondary capture status may be determined using an image classifier as described in this disclosure wherein the image classifier may be configured to detect features of an image that are most commonly found in secondary captures. For example, and without limitation, image classifier may be configured to identify camera glare, discoloration, image orientation and the like. In one or more embodiments, secondary capture may be determined in any way as described in this disclosure. In one or more embodiments, determining relationship between image slices may include determining secondary capture status of one or more image slices. In one or more embodiments determining relationship between image slices may include determining any commonality between two or more image slices, such as and without limitation, similarities in metadata 128, similarities in color, similarities in image size, similarities in textual information 140 and the like.

With continued reference to FIG. 1, processor 108 is configured to mask one or more image slices within plurality of image slices 124. In one or more embodiments, a process of masking image slices may include a processor 108 of removing image slices from plurality of image slices 124. In one or more embodiments, a process of masking image slices may include cropping image slices based on a location of textual information 140 within image slices. In one or more embodiments, a process of masking image slices may include a process of inpainting image slices. "Inpainting," as described in this disclosure, refers to a process in which unwanted portions of an image are filed based on surrounding pixels. For example, and without limitation, portions of an image containing textual information 140 may be filled using surrounding pixels such that textual information 140 is removed from the images. In one or more embodiments, a process of initiating may include utilizing a machine learning model to predict portions of images within image slices Bing textual information. In one or more embodiments, the machine learning model may be trained on a plurality of electric health records, including but not limited to, MRI scans. CT scans and the like. In one or more embodiment, plurality of electronic health records may be used to identify various features within images. In one or more embodiments, learned features may be used to predict portions of on image that have been covered by text. For example, and without limitation, the machine learning model may be configured to predict portions of an image depicting a brain scan that have been covered by text. In one or more embodiments, image slices from current iterations and predicted outputs may be iteratively fed into the machine learning model for future iterations. In one or more embodiments, processor 108 may use segment images in area in which textual information 140 may be present. In one or more embodiments, masking may include a process in which portions of an image containing textual information 140 are pixelated in order to make the textual information 140 unreadable. In one or more embodiments, masking may include the removal of textual information 140 through processes such as image segmentation, inpainting, content-aware fill, pixelation and the like. In one or more embodiments, images that are selected for masking may be referred to as 'masked image slices'. In one or more embodiments, masked image slices 156 may include image slices that are to be masked. In one or more embodiments, masked image slices 156 may include both image slices within subset of image slices and image slices within plurality of image slices 124.

With continued reference to FIG. 1, processor 108 may be configured to mask image slices based on second output and/or third output. In one or more embodiments, processor 108 may be configured to mask all image slices within plurality of image slices 124 if the second output for any image slice indicates all slices should be masked. In one or more embodiments, information within second output may be used to determine if all slices should be masked. For example, and without limitation, second output may include a determination of consecutive order status, a determination of a comparison to a threshold as described above and/or any other determinations as described in this disclosure that may warrant masking of all image slices. In one or more embodiments, second output may include any process as described herein which may indicate whether all image slices should be masked. This may include, but is not limited to, the modality used, the presence of textual information on multiple image slices and the like. In one or more embodiments, processor 108 may be configured to mask any slice where the third output for that slice indicates that slice should be masked. In one or more embodiments, processor may be configured to mask only slices containing PII but not configured to mask all slices. In one or more embodiments, only slices containing information may be masked while other image slices may remain visible.

With continued reference to FIG. 1, processor 108 may be configured to mask one or more image slices within plurality of image slices 124 based on a probability that the one or more image slices contain personally identifiable information. In one or more embodiments, processor 108 may determine that one or more image slices may contain personally identifiable information based on text classification, wherein text classifier 148 may be configured to identify textual information 140, classify textual information 140 and determine if textual information 140 contains personally identifiable information based on classification. In one or more embodiments, processor 108 may be configured to determine if image slices may contain personally identifiable information based on metadata 128 wherein a particular origin may indicate that the image slice has a high probability of containing personally identifiable information. For example, and without limitation, metadata 128 indicating that the image slices are MRI scans may indicate that there is a high likelihood of personally identifiable information within the scans. In one or more embodiments, image classifier and/or metadata 128 may be used to determine if image slices contain a secondary capture status wherein image slices containing secondary capture status may be masked to their increased likelihood of containing personally identifiable information. In one or more embodiments, processor 108 may be configured to mask image slices in any way as described in this disclosure.

With continued reference to FIG. 1, processor 108 may be configured to mask one or more image slices within plurality of image slices 124 based on metadata 128 and/or relationship between image slices within subset of image slices 136. In one or more embodiments, processor 108 may be configured to mask plurality of image slices 124 in instances in which every image slice within subset of image slices 136 contains textual information 140 and/or personally identifiable information. In one or more embodiments, processor 108 may be configured to mask only image slices within subset of image slices 136 containing textual information 140 and/or personally identifiable information. In one or more embodiments, subset of image slices 136 may include image slices having the highest probability of containing textual information 140 wherein processor 108 may be configured to mask image slices within subset of image slices 136 in instances in which textual information 140 is identified. In one or more embodiments, processor 108 may be configured to mask all image slices within plurality of image slices 124 if a predetermined number of image slices within subset of image slices 136 contain textual information 140. For example, and without limitation, processor 108 may mask all image slices within plurality of image slices 124 in instances in which 70% or more of image slices within subset of image slices 136 contain textual information 140. In one or more embodiments, processor 108 may determine a relationship between image slices within subset of image slices 136 and mask one or more image slices within plurality of image slices 124 as a function of the relationship. For example, and without limitation, processor 108 may determine if image slices are in consecutive order wherein 3 image slices in consecutive order having textual information 140 may indicate that all image slices within plurality of image slices 124 should be masked. In one or more embodiments, processor 108 may determine that if at least a first image and/or at least a last image contain textual information 140 then all image slices within plurality of image slices 124 should be maxed. In one or more embodiments, the presence of textual information 140 and/or the relationship between image slices within subset of image slices 136 may be indicative of whether plurality of image slices 124 should be masked. In one or more embodiments, subset of image slices 136 may be generated by extracting image slices between a predetermined spatial amount within plurality of image slices 124. For example, and without limitation, processor 108 may generate subset of image slices 136 by extracting every $5^{th}$ image slices from plurality of image slices 124. In one or more embodiments, processor 108 may be configured to mask all image slices within plurality of image slices 124 in instances in which the image slice contains textual information 140. For example, and without limitation, processor 108 may be configured to extract the $5^{th}$ image slice, the $10^{th}$ image slice, the $15^{th}$ image slice and the like from plurality of image slices 124. Continuing, in instances in which the $5^{th}$ image slice contains textual information 140, the $5^{th}$ image slice until the $10^{th}$ image slice are masked. Continuing, in instances in which the $10^{th}$ image slice does not contain textual information 140, then the $10^{th}$ image slice until the $15^{th}$ image slice are not masked.

With continued reference to FIG. 1, image slices within subset of image slices 136 may be compared to a masking threshold 160. A "masking threshold" for the purposes of this disclosure is a predetermined amount of textual information 140 that, when exceeded, would result in masking of the image slice. For example, and without limitation, a masking threshold 160 may include 100 words wherein image slices containing textual information 140 with more than 100 words may be masked. In an embodiment, masking threshold 160 may indicate that a particular image slice containing too many words have a high probability of containing personally identifiable information. In one or more embodiments, processor 108 may be configured to compare image slices within subset of image slices 136 to masking thresholds 160 wherein each image slice may be compared to masking threshold 160. In one or more embodiments, image slices may be masked if textual information 140 within said image slice exceeds the masking threshold 160. In one or more embodiments, in instances in which a predetermined amount of image slices exceed a masking threshold 160, all image slices within plurality of image slices 124 may be masked. In one or more embodiments, processor 108 may be configured to compare subset of image slices 136 to a masking threshold 160 as a function of text classier and mask one or more image slices as a function of the comparison. In one or more embodiments, masking threshold 160 may include any threshold as described in this disclosure. In one or more embodiments, processor 108 may be configured to mask image slices in any way as described in this disclosure.

With continued reference to FIG. 1, in one or more embodiments, processor 108 may be configured to receive a series of images 120, the series including metadata 128 and a plurality of image slices 124. In one or more embodiments, processor 108 may be configured to read the metadata 128 and select a sampling strategy 144 based on the metadata 128, wherein the sampling strategy 144 identifies a subset of image slices 136 of the plurality of image slices 124 to sample. In one or more embodiments, processor 108 may be configured to apply text classifier 148 to the subset of image slices 136 identified by the sampling strategy 144, wherein, for each image slice of the subset of image slices 136, the text classifier 148 provides a first output indicating whether that image slice contains text. In one or more embodiments, processor 108 may be configured to provide a second output for each image slice based on the first output for that image slice, the metadata 128, and a position of that image slice in the image series, wherein the second output indicates whether to mask all image slices in the series. In one or more embodiments, processor 108 may further be configured to provide a third output for each image slice based on the first output for that image slice, the metadata 128, and a position of that image slice in the image series, wherein the second output indicates whether to mask that image slice. In one or more embodiments, processor 108 may be configured to mask all slices if the second output for any slice indicates all slices should be masked and masking any slice where the third output for that slice indicates that slice should be masked.

With continued reference to FIG. 1, sampling strategy 144 may be selected based on a modality 132, a manufacturer, tags related to secondary capture, or a combination thereof. In one or more embodiments, the sampling strategy 144 may be selected based on modality 132. For example, different modalities may have metadata located in different locations. This may cause different sampling strategies 144 to be optimal for different modalities. As a non-limiting example, for an echocardiogram, text and/or metadata may be expected on each frame. Therefore, the sampling strategy 144 for an echocardiogram modality may be to sample every slice. As a non-limiting example, for a CT scan, text and/or metadata may be expected only on the first few slides. As a non-limiting example, sampling strategy 144 for a CT scan may include sampling the first N slices (e.g., first 10 slices). As a non-limiting example, sampling strategy 144 for a CT scan may additionally include sampling a percentage of the slides outside of the first N slides (such as, for example, 10%, 25%, or the like). In one or more embodiments, the text classifier 148 includes a neural network. In one or more embodiments, the second output for a slice indicates that all slices should be masked if the image series is a secondary capture. In one or more embodiments, the second output of a slice indicates that all slices should be masked if the number of slices in the subset that contain text exceeds a threshold. In one or more embodiments, the second output of a slice indicates that all slices should be masked if the series of images 120 is a head study. In one or more embodiments, the third output of a slice indicates that slice should be masked if that slice contains text. In one or more embodiments, the third output of a slice indicates that slice should be masked if the slice is at a position in the image series that a heuristic has determined should be masked. In one or more embodiments, a neural network provides one or more of the second output and the third output. In one or more embodiments, determining relationship between image slices as described above may include providing second output and/or third output. In one or more embodiments, the subset of slices includes the first slice of the series of images 120. In one or more embodiments, the subset of slices includes the last slice of the series of images 120. In one or more embodiments, the text classifier 148 is not applied to slices outside of the subset of slices. In one or more embodiments, the series of image a series of DICOM images. In one or more embodiments masking an image slice includes removing that slice. In one or more embodiments, masking a slice includes masking all pixels of that slice. In one or more embodiments, masking a slice includes masking a portion of that slice. In one or more embodiments, masking a slice includes replacing all pixels of that slice with a constant intensity. In one or more embodiments, masking a slice includes replacing a portion of pixels of that slice with a constant intensity. In one or more embodiments, the metadata 128 is a header of the series of images 120. In one or more embodiments, processor 108 may be configured to mask personally identifiable information in the metadata 128. In one or more embodiments, the number of slices in the subset is less than the number of slices in the series and the number of slices in the subset is selected to improve efficiency.

With continued reference to FIG. 1, sampling strategy 144 may allow for reduction in computing cost compared to running a text classifier on each slice of the series of images 120. Looking at every slice for text to determine whether or not to mask it is computationally expensive. Thus, it is desirable to intelligently determine a sampling strategy that best fits a series of images 120 having certain characteristics in order to minimize computational cost for PII masking.

With continued reference to FIG. 1, in some embodiments, sampling strategy 144 may include a percentage of slices to sample. In some embodiments, 50% of slices may be sampled. In some embodiments, 40% of slices may be sampled. In some embodiments, 30% of slices may be sampled. In some embodiments, 20% of slices may be sampled. In some embodiments, 10% of slices may be sampled. In some embodiments, 60% of slices may be sampled. In some embodiments, 70% of slices may be sampled. In some embodiments, sampling strategy may include a sampling percentage anywhere from 10% to 70% of slices. In some embodiments, sampling strategy may include a sampling percentage anywhere from 10% to 50% of slices. In some embodiments, sampling strategy may include a sampling percentage anywhere from 20% to 40% of slices. In some embodiments, sampling strategy 144 may include a sampling frequency. Sampling frequency may include sampling every $2^{nd}$ slice. Sampling frequency may include sampling every $3^{rd}$ slice. Sampling frequency may include sampling every $4^{th}$ slice. Sampling frequency may include sampling every $5^{th}$ slice. Sampling frequency may include sampling every $6^{th}$ slice. Sampling frequency may include sampling every $8^{th}$ slice. Sampling frequency may include sampling every $7^{th}$ slice. Sampling frequency may include sampling every $9^{th}$ slice. Sampling frequency may include sampling every $10^{th}$ slice. In some embodiments, sampling strategy 144 may include sampling a first slice. In some embodiments, sampling strategy 144 may include sampling a last slice. In some embodiments, sampling strategy 144 may include sampling a first N number of slides. N, in this case, may be any number from 0 to the total number of slices in series of images 120. In some embodiments, sampling strategy 144 may include sampling a last N number of slides in the series of images 120. N, in this case, may be any number from 0 to the total number of slices in series of images 120. In some embodiments, sampling strategy 144 may include sampling a set number of slices at the beginning and/or end of sampling strategy 144 then sampling a percentage of frequency of slices from the remaining slices in series of images 120.

With continued reference to FIG. 1, series of images 120 may be received through user input such as through a laptop, smartphone, desktop computer and the like. In one or more embodiments, user input, may include an input of information by a medical professional, an individual seeking to hide personally identifiable information and the like. In one or more embodiments, processor may receive series of images 120 and output plurality of image slices with masked image slices 156. In one or more embodiments, plurality of image slices 124 may include masked image slices 156 wherein masked image slices may either be removed and/or modified in order to mask textual information. In one or more embodiments, plurality of image slices may be displayed to user through a user interface such as a graphical user interface. In one or more embodiments, apparatus 100 may include a graphical user interface (GUI). For the purposes of this disclosure, a "user interface" is a means by which a user and a computer system interact. For example, through the use of input devices and software. In some cases, processor may be configured to modify graphical user interface as a function of masked image slices and visually present plurality of image slices including masked image slices 156 through GUI. A user interface may include graphical user interface, command line interface (CLI), menu-driven user interface, touch user interface, voice user interface (VUI), form-based user interface, any combination thereof and the like. In some embodiments, a user may interact with the user interface using a computing device distinct from and communicatively connected to processor. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI may contain one or more interactive elements. An "interactive element" for the purposes of this disclosure is an element within a graphical user interface that allows for communication with apparatus 100 by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on GUI, wherein the selection of a particular push button may result in a particular function. In one or more embodiments, interactive elements may include words, phrases, illustrations and the like to indicate the particular process the user would like system to perform. In one or more embodiments, interaction with interactive elements may result in the display of plurality of image slices 124. In one or more embodiments, interactive elements may be used to navigate between image slices in order to view how properly image slices have been masked. In one or more embodiments, GUI may display which image slices have been masked and the type of information masked based on their classification to an information class.

With continued reference to FIG. 1, apparatus 100 may further include a display device communicatively connected to at least a processor 108. "Display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through GUI to a user, wherein a user may interact with the data through GUI. In some cases, a user may view GUI through display device.

Figure 2:
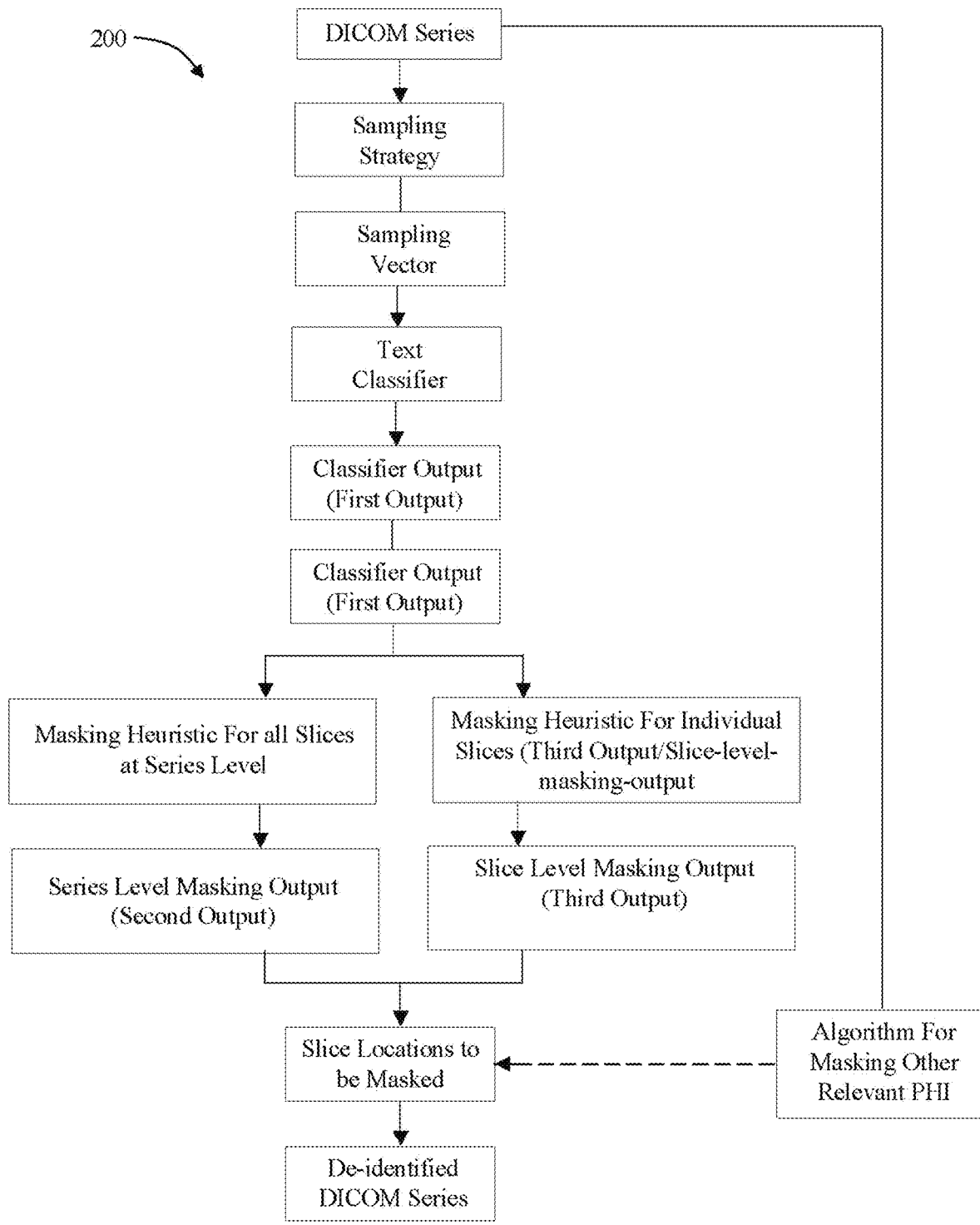
FIG. 2 shows an illustrative embodiment of methods and systems for de-identification of images.

FIG. 2 shows an illustrative embodiment 200 of the methods and systems disclosed herein. In this example a DICOM series is de-identified. In this example, a text de-identification method is applied to the image series, while another optional algorithm can be used to mask other relevant protected healthcare information (PII or PHI). The text-de-identification method in this example includes the following steps. First, the method reads the metadata from the image series and selects a sampling strategy on the metadata. Then, a sampling vector is generated based on the sampling strategy sample slices of the image series that are likely to contain text. Then, a text classifier is run on the slices identified by the sampling vector. The text classifier provides an output (e.g., a first output) for each slice indicating whether each sampled slice contains text. Then, masking heuristics are applied (1) for all slices at the series level, and (2) for individual slices as the slice level. Masking heuristics can be selected based on the metadata of the image series. The series level masking heuristic provides an output indicating whether all slices of the series should be masked (e.g., a second output) and the slice level masking heuristic indicating provides an output for each slice indicating whether that individual slice should be masked (e.g., a third output). The outputs of the masking heuristics (e.g., the second output and the third output) indicate locations of slices to be masked. Then, the image series can be de-identified by masking the indicated slices. The de-identification by the text de-identification method can be combined with the output of an optional algorithm for masking other relevant PHI.

Figure 3:
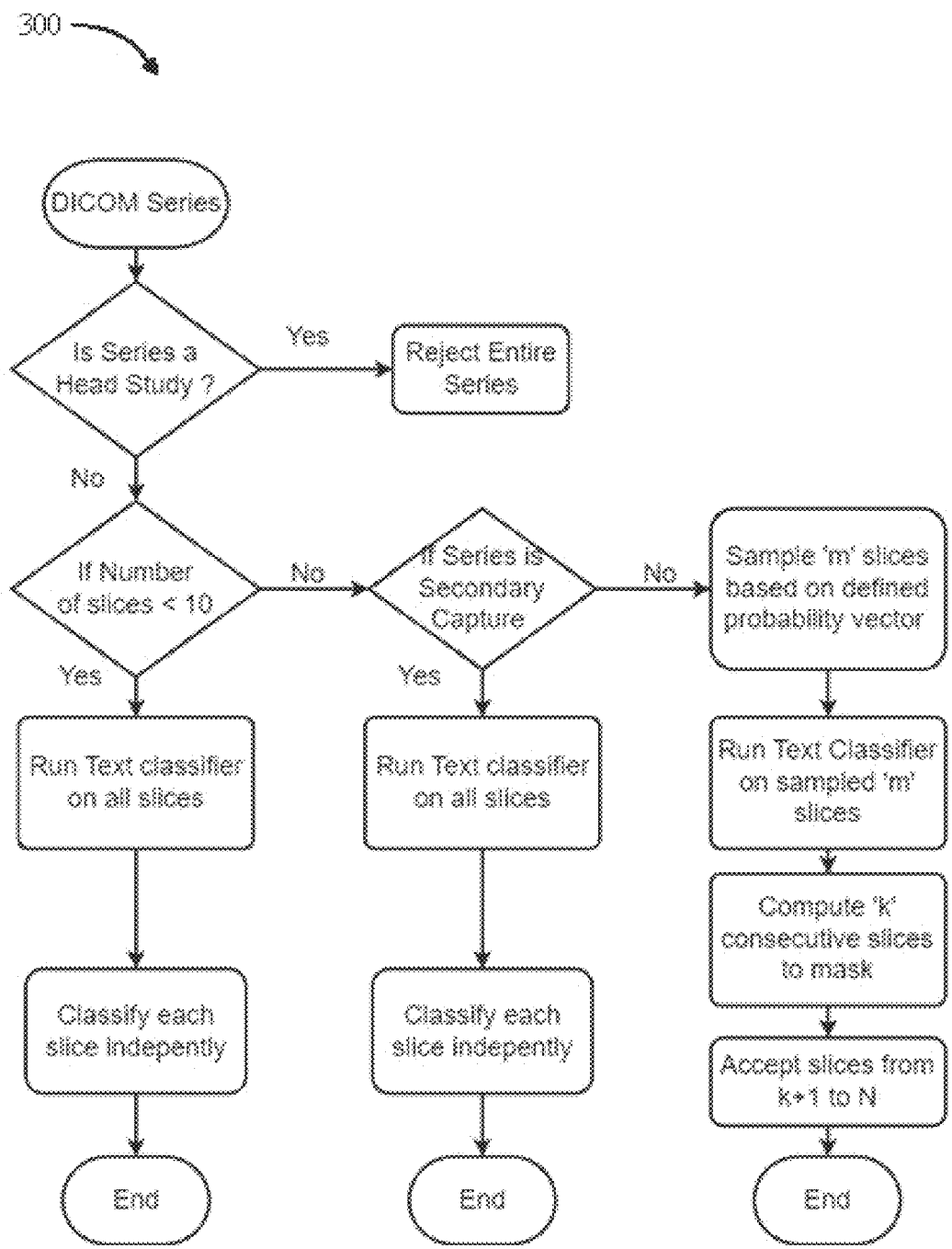
FIG. 3 shows an illustrative embodiment of methods and systems for de-identification. of CT images.

FIG. 3 shows an illustrative embodiment 300 of the methods and systems disclosed herein. In this example, a DICOM series with N slices is de-identified. This illustrative method can be used to de-identify a CT image series. First, the method determines whether the series is a head study (e.g., images of the head of a person). A head study can be identified based on metadata or header data. In this example, if the series is a head study, the entire series is rejected because a more complex de-identification method should instead be used to de-identify a head study. Then, if the number of slices is less than a threshold (e.g., IO slices) a text classifier is run on all slices and each slice is classified independently. If the text classifier identifies text in a slice, that slice will be masked. In this example, the text classifier can be run on all slices, without a need for sampling, if the number of slices is small. If the number of slices is greater than the threshold, the method will then determine if the series is a secondary capture. A secondary capture is a derived series that comes from a primary series. For example a secondary capture may include additional analysis that is saved with the primary. If the series is a secondary capture, a text classifier is run on all slices and each slice is classified independently. For a secondary capture, the text classifier is run on all slices because a third party software may have generated the secondary capture and added text, including PII, that would not be predicted by the sampling strategy. If the text classifier identifies text in a slice, that slice will be masked. If the series is not a secondary capture (e.g., if it is a primary series), the method will read the metadata and use the metadata to select a sampling strategy. In this example, the sampling strategy includes a defined probability vector and the sampling strategy will sample m slices.

The value of m can be determined based on the modality, manufacturer, or combination thereof. Next, a text classifier is run on them sampled slices. The heuristic will compute a value k based on which slices include text to identify which consecutive slices to mask, e.g., slices from 1 to k, indicating the last slice in m that includes text. Then, slices from k+1 to N are accepted (not masked) if none of the sampled slices between k to N are determined to have text by the text classifier. If any of the remaining slices have text, as determined by the text classifier, the entire series is rejected. In other examples, the text classifier can calculate a vector that indicates the location of each slice that includes text. The indices can be used later to determine which slices need to be masked.

In another example, the methods and systems disclosed herein use modality-specific knowledge, information from pixel values in a DICOM image and information available in DICOM headers. For example, for de-identification of modalities such as CT, MR and PET, PII can be present in either the DICOM headers or the DICOM image pixels. DICOM headers can contain multiple fields and undergo field specific transformation as part of de-identification or masking of PII in a header. Transformations can either retain the field, remove the field, or replace the field with field-specific synthetic information. In this example, DICOM image pixels (e.g., from CT, MR or PET series) can be analyzed independently by a text classifier or neural network for the presence of text. For example, the method can sample a few images at the beginning of the series, middle of the series, or at the end of the series, depending on the sampling strategy, and apply a text classifier or neural network to those slices. Then, the system can check to infer whether to mask a portion of slices or whether to mask all slices. For example, if all sampled images have text, then the whole series can be masked. Alternatively, if only some of the sampled images have text, a binary search can be done to identify k, which is the number of slices at the beginning of the series which include text. These k images can be masked and the remaining images are retained to be stitched with the transformed DICOM header data.

Figure 4:
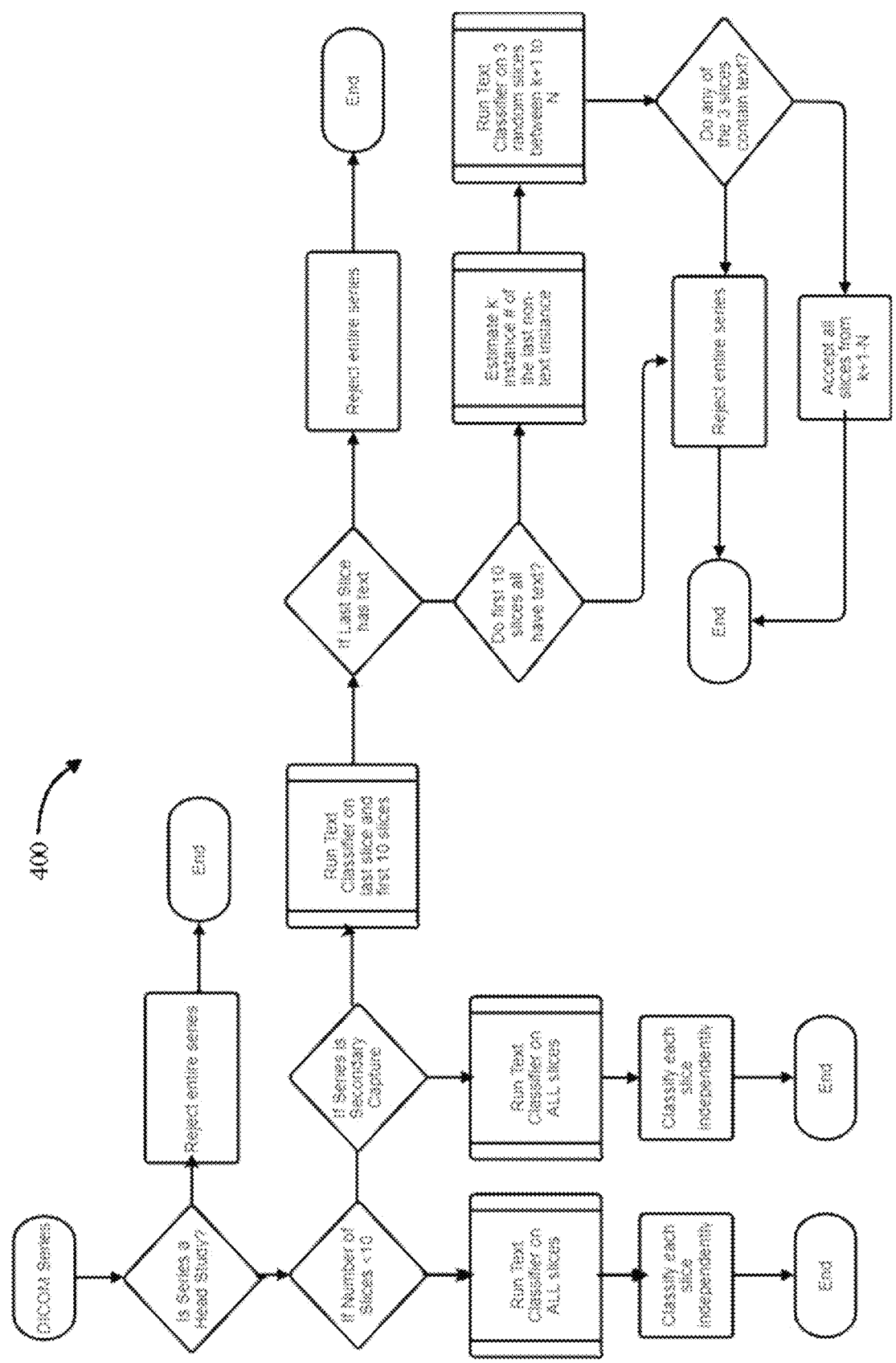
FIG. 4 shows another illustrative embodiment of methods and systems for de-identification of CT images.

FIG. 4 shows an illustrative embodiment 400 of the methods and systems disclosed herein. In this example, a DICOM series with N slices is de-identified. This illustrative method can be used to de-identify a CT image series. First, the method determines whether the series is a head study (e.g., images of the head of a person). In this example, if the series is a head study, the entire series is rejected because a more complex de-identification method should be used to de-identify a head study. Then, if the number of slices is less than a threshold (e.g., IO slices) a text classifier is run on all slices and each slice is classified independently. If the text classifier identifies text in a slice, that slice will be masked. In this example, the text classifier can be run on all slices, without a need for sampling, if the number of slices is small. If the number of slices is greater than the threshold, the method will determine if the series is a secondary capture. A secondary capture is a derived series that comes from a primary series. For example, a secondary capture may include additional analysis that is saved with the primary series. If the series is a secondary capture, a text classifier is run on all slices and each slice is classified independently. If the text classifier identifies text in a slice, that slice will be masked. If the series is not a secondary capture, the method will sample a subset of slices. In this example, the sampling strategy includes sampling the last slice and the first IO slices and running the text classifier on the last slice and the first IO slices. If the last slice includes text, the entire series is rejected. This occurs because this illustrative sampling strategy indicates that text in the last slice means that all slices are likely to include text. If the last slice does not have text, the method determines whether all of the first IO slices include text. If all IO slices have text, the entire series is rejected or masked. If not all IO slices have text, the heuristic will estimate k, the number of the last non-text slice and the method will run the text classifier on three random slices between k+1 and N. If any of these three slices include text, the entire series is rejected or masked. If none of the three slices include text, the slices from I to k are masked, and the slices from k+1 to N are accepted. If any series is rejected, the entire series can be masked, or a more complex de-identification method can be used.

Figure 5:
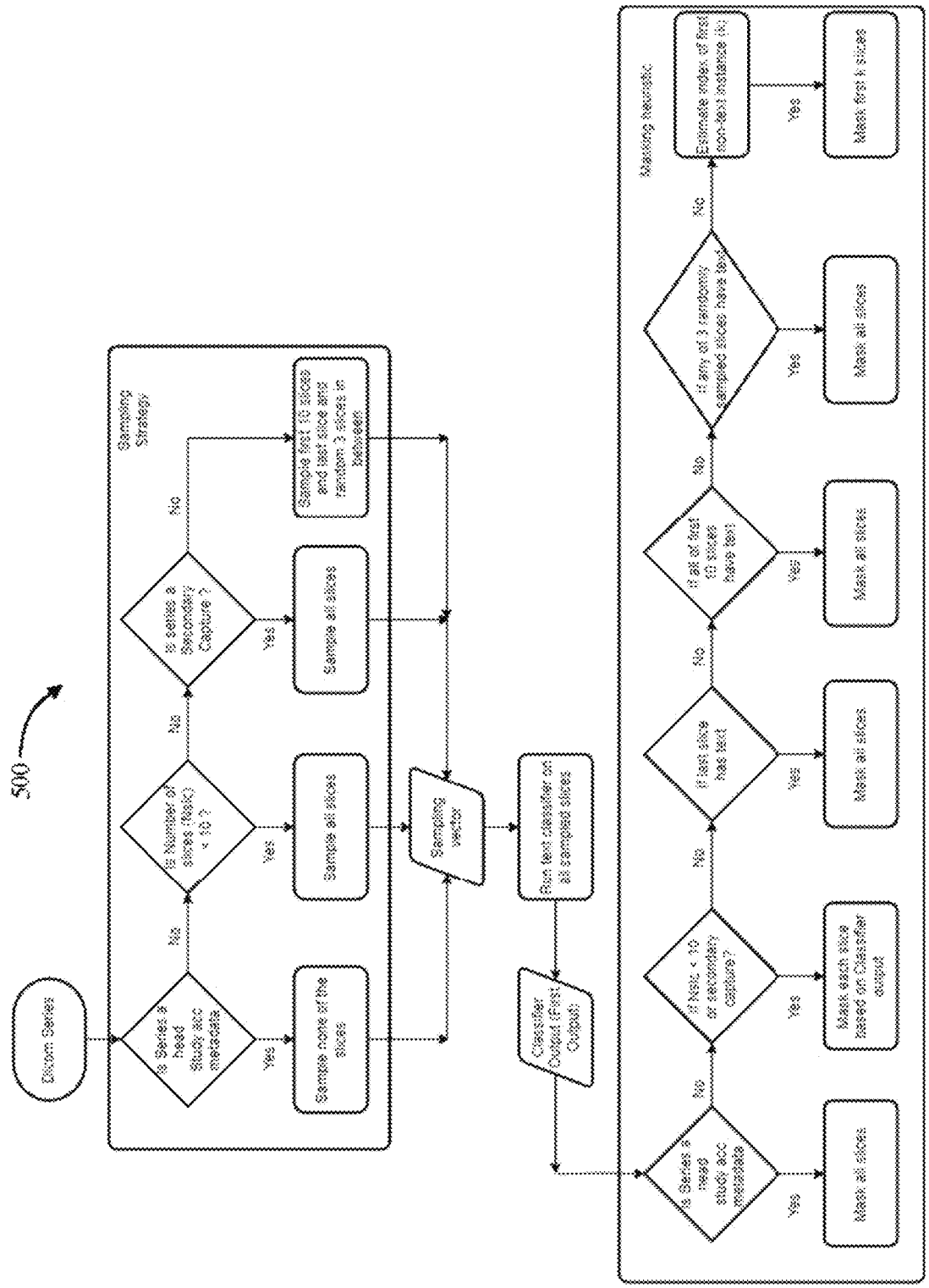
FIG. 5 shows an illustrative embodiment of methods and systems for de-identification of CT images, according to certain embodiments.

FIG. 5 shows an illustrative embodiment 500 of the methods and systems disclosed herein. FIG. 5 shows an illustrative embodiment 500 of the methods shown in FIG. 4. In this example, a DICOM series with N slices is de-identified. This illustrative method can be used to de-identify a CT image series. First, a sampling strategy is selected. To select a sampling strategy, the method first determines whether the series is a head study. In this example, if the series is a head study, none of the slices are sampled, and the entire series is rejected. Then, if the series is not a head study, the method determines whether the number of slices is less than a threshold (e.g., IO slices). In this example, if N is less than the threshold, all slices are sampled. If N is not less than then threshold, the method determines whether the series is a secondary capture. If the series is a secondary capture, then all slices are sampled. If the series is not a secondary capture, then a different sampling strategy is selected, e.g., sample the first IO slices and last slice and random 3 slices between. After a sampling strategy is selected, a sampling vector is generated indicating the probability of sampling each slice. Next, a text classifier is run on all sampled slices, based on the sampling vector, creating a classifier output (first output) for each sampled slice.

Then, a masking heuristic is applied based on a combination of the classifier output and metadata. In the example shown in FIG. 5, the method first determines whether the series is a head study. In this example, if the series is a head study, all slices are masked. Then, if the series is not a head study, the method determines whether the number of slices is less than a threshold (e.g., 10 slices). In this example, if N is less than the threshold, each slice is masked based on the text classifier output. If N is greater than the threshold, the method determines whether the last slice has text. If the last slice has text, all slices are masked. If the last slice does not have text, the method will determine whether all of the first 10 slices have text. If yes, then all slices are masked. If not all of the first 10 slices have text, the method will determine whether any of the three randomly sampled slices have text. If yes, then all slices are masked. If no, then the method estimates the index of the first non-text instance k and masks the first k slices.

Figure 6A:
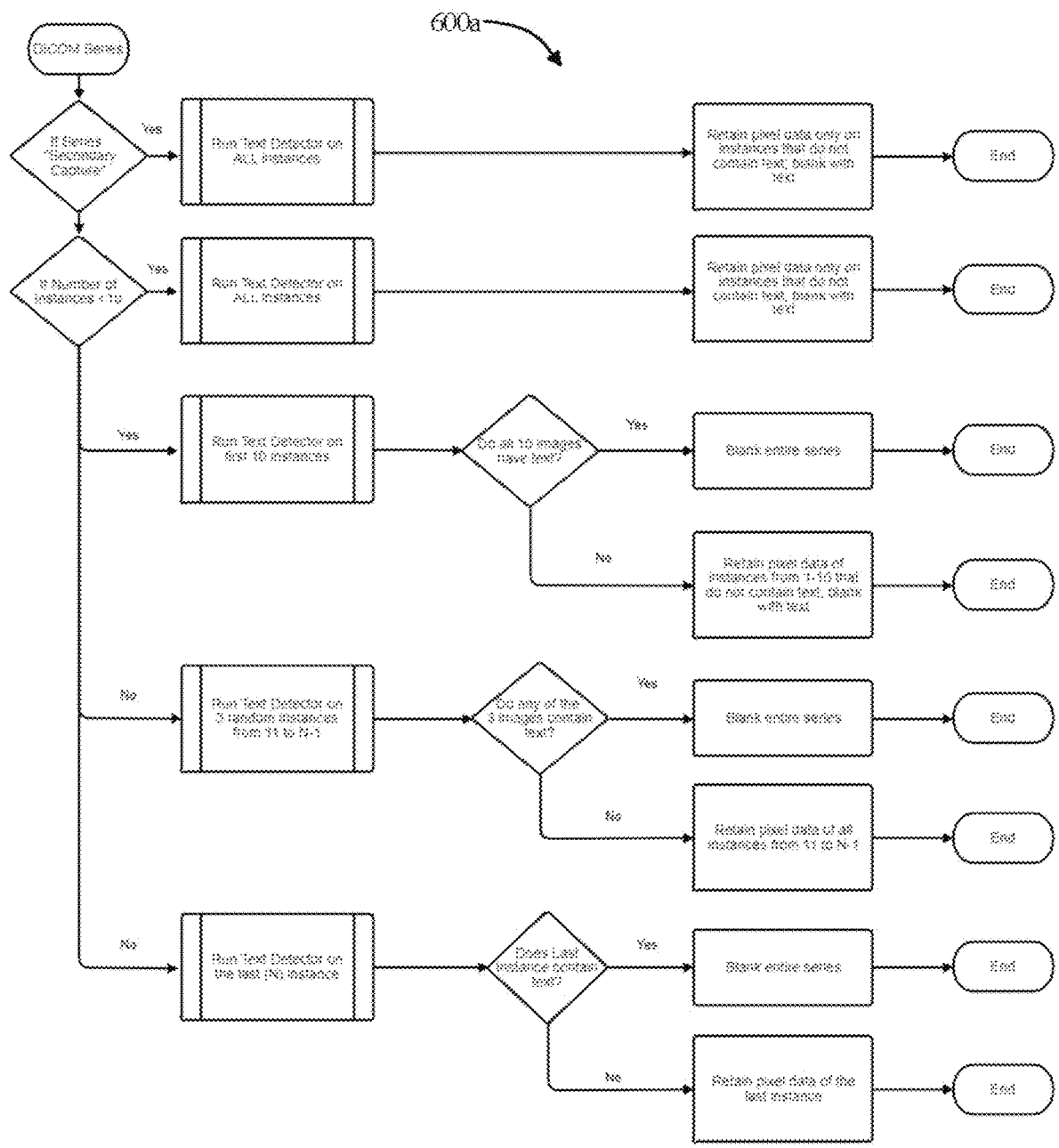
FIGS. 6A-6C show illustrative embodiments of methods and systems for de-identification of MR images, according to certain embodiments.

FIG. 6A shows an illustrative embodiment 600a of an MRI text de-identification workflow. In this example, a DICOM series with N slices is de-identified. First, the method determines whether the series is a secondary capture. If the series is a secondary capture, a text classifier is run on all slices, and pixel data is retained for slices that do not have text and blanked or masked for slices that have text. If the series is not a secondary capture, the method determines whether the number of slices is less than a threshold (e.g., 10 slices). In this example, if N is less than the threshold, then the text classifier is run on all slices, and pixel data is retained for slices that do not have text and blanked for slices that have text. If N is greater than the threshold the text classifier is run on the first 10 slices. If the first 10 slices all have text, then the entire series is masked or blanked. If the first 10 slices do not all have text, then for the first 10 slices, pixel data is retained for slices that do not have text and blanked for slices that have text. The text classifier is then run on three random slices between 11 and N−1. If any of the three slices have text, the entire series is masked or blanked. If none of the three slices have text, the pixel data is retained for all slices from 11 to N−1. The text classifier is then run on the last slice (N). If the last slice has text, then the entire series is masked or blanked. If the last slice does not have text, the pixel data is retained for the last slice.

Figure 6B:
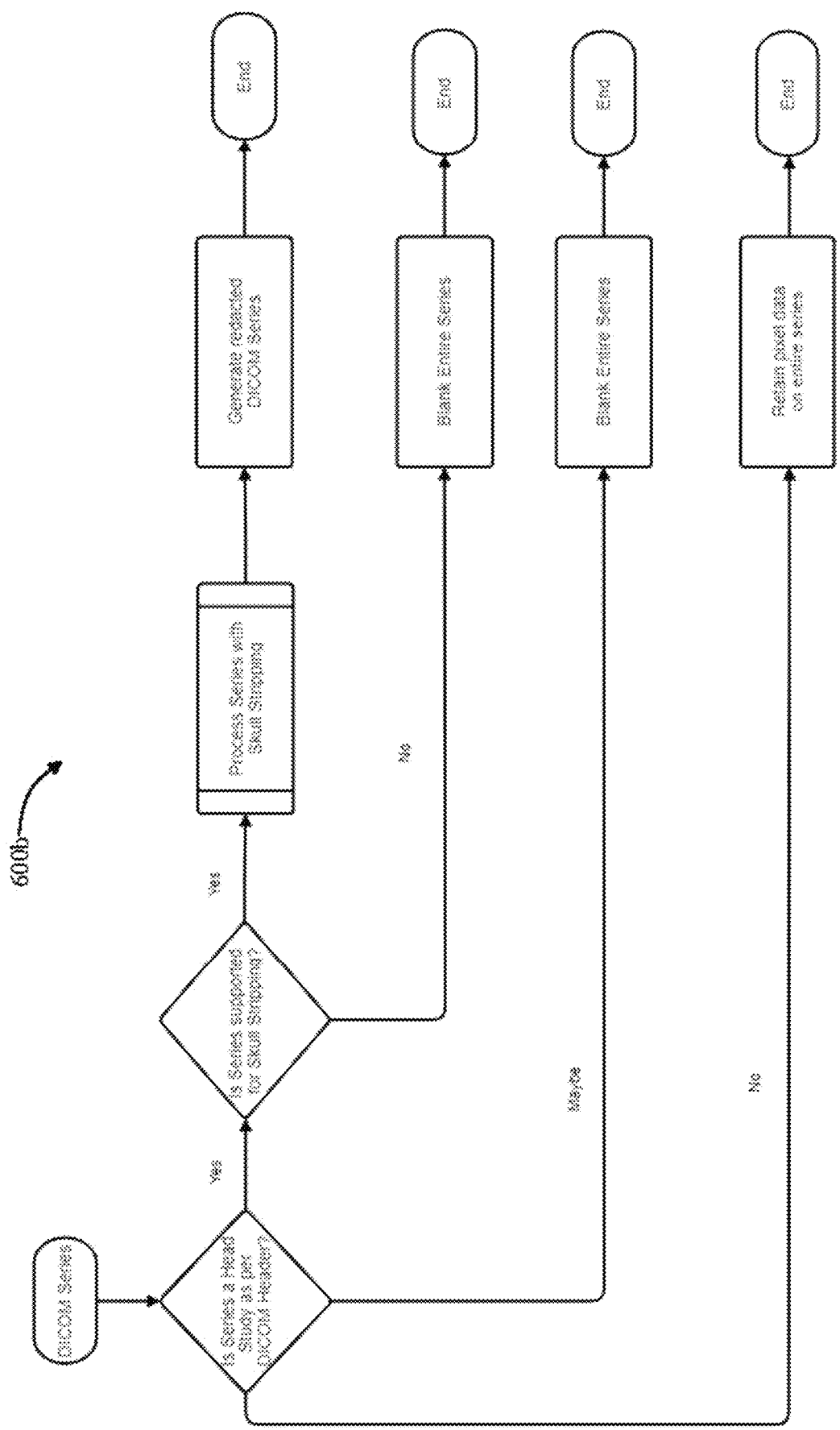

FIG. 6B shows an illustrative embodiment 600b of an MRI head de-identification workflow that can be combined with an MRI text de-identification workflow. In this example, a DICOM series is de-identified. First, the method determines, based on the metadata or header, whether the series is a head study. If not, the pixel data can be retained for the entire series. If the series is maybe a head study, then the entire series can be blanked or masked. If the series is a head study, the method can determine whether the series is supported for a skull stripping algorithm. If the series is not supported for skull stripping, then the entire series is blanked or masked. If the series is supported for skull stripping the series can be processed with a skull stripping algorithm and a redacted DICOM series is generated.

Figure 6C:
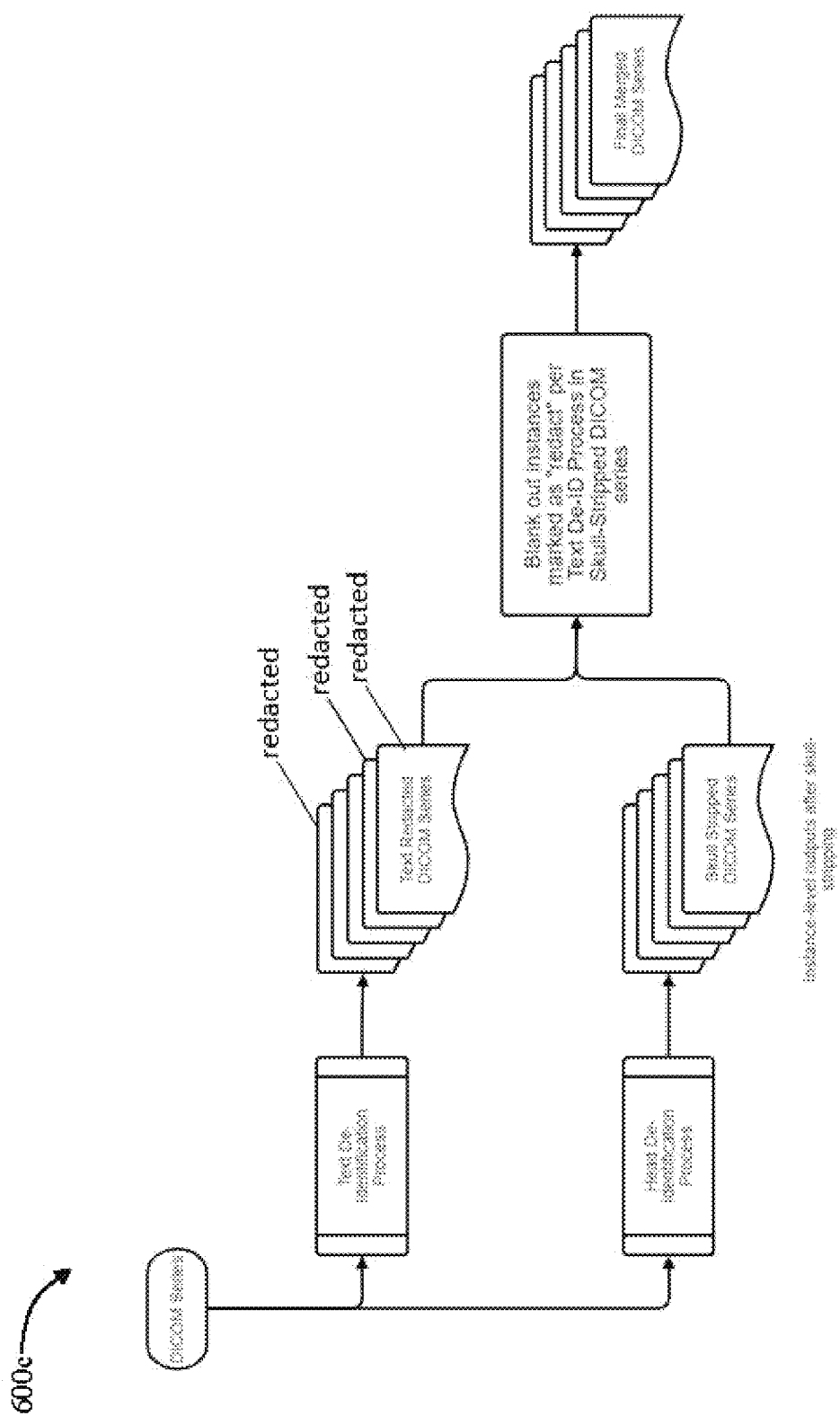

FIG. 6C shows an illustrative embodiment 600c of an MRI de-identification workflow combining an MRI text de-identification workflow and a head MRI de-identification workflow. In this example, both a text de-identification process and a head de-identification process are run on the DICOM series. The text de-identification process outputs a list of indices of the series (marked "redacted" in FIG. 6C) which are to be masked or blanked. The head de-identification process outputs a skull stripped DICOM series. Then the method merges the two de-identification outputs by masking any slices of the skull-stripped DICOM series where the corresponding slice is marked as "redact" by the text de-identification process.

Figure 7:
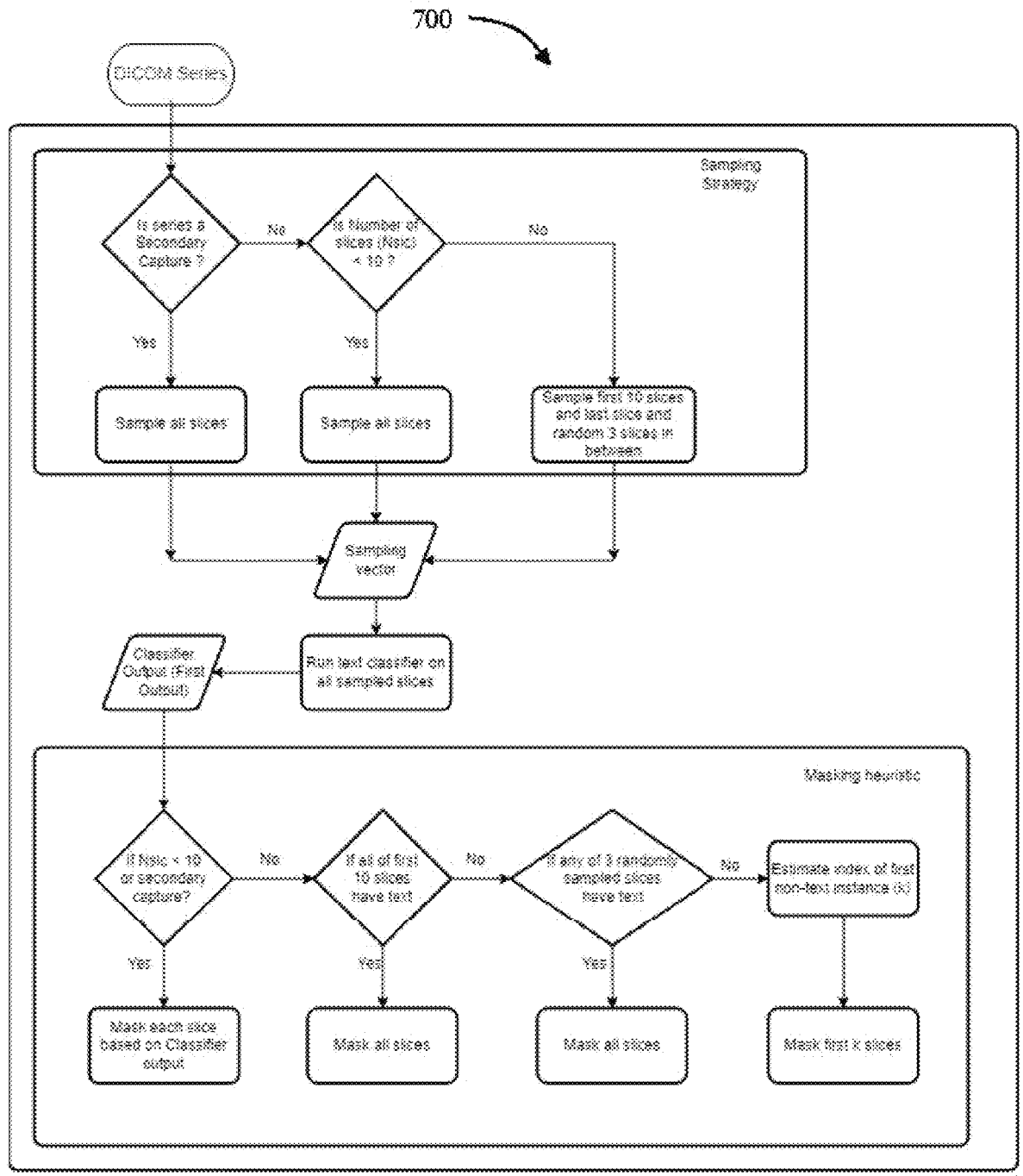
FIG. 7 shows an illustrative embodiment of methods and systems for de-identification of MR images, according to certain embodiments.

FIG. 7 shows an illustrative embodiment 700 of an MRI text de-identification workflow. FIG. 7 shows an illustrative embodiment 700 of the methods shown in FIG. 6A. In this example, a DICOM series with N slices is de-identified. This illustrative method can be used to de-identify a MR image series. First, a sampling strategy is selected. To select a sampling strategy, the method first determines whether the series is a secondary capture. In this example, if the series is a secondary capture, all slices are sampled. Then, if the series is not a secondary capture, the method determines whether the number of slices is less than a threshold (e.g., IO slices). In this example, if N is less than the threshold, all slices are sampled. If N is not less than then threshold, a different sampling strategy is selected, e.g., sample the first IO slices and last slice and random 3 slices between. After a sampling strategy is selected, a sampling vector is generated indicating the probability of sampling each slice. Next, a text classifier is run on all sampled slices, based on the sampling vector, creating a classifier output (first output) for each sampled slice.

Then, a masking heuristic is applied based on a combination of the classifier output and metadata. In the example shown in FIG. 7, the method first determines whether the series is a secondary capture or if N is less than the threshold. In this example, if the series is a secondary capture or N is less than the threshold, each slice is masked based on the text classifier output. If the series is not a secondary capture and N is greater than the threshold, the method will determine whether all of the first IO slices have text. If yes, then all slices are masked. If not all of the first 10 slices have text, the method will determine whether any of the three randomly sampled slices have text. If yes, then all slices are masked. If no, then the method estimates the index of the first non-text instance k and masks the first k slices.

Figure 8:
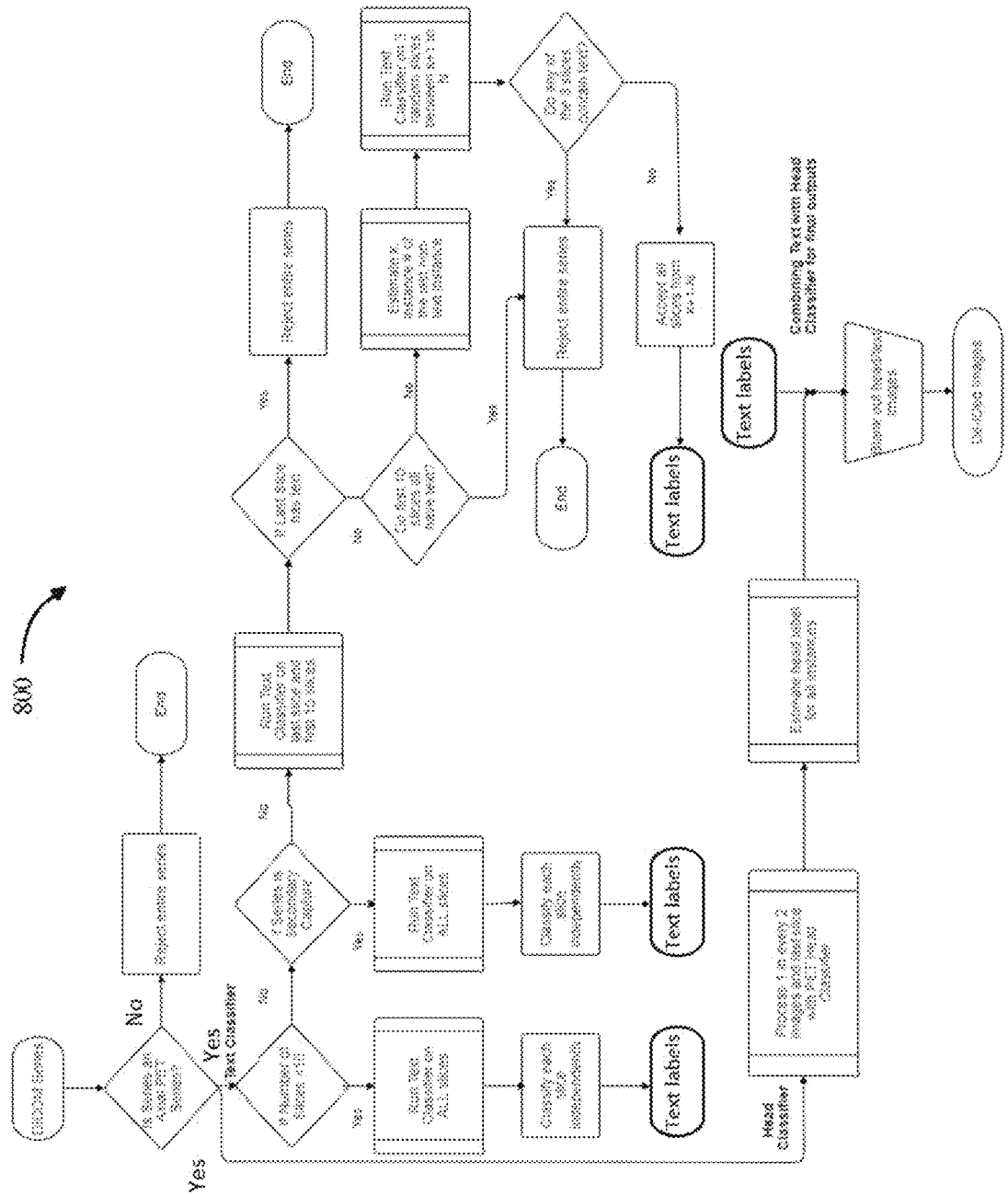
FIG. 8 shows an illustrative embodiment of methods and systems for de-identification of PET images, according to certain embodiments.

FIG. 8 shows an illustrative embodiment 800 of a PET text de-identification workflow combined with a head deidentification workflow. In this example, a DICOM series with N slices is de-identified. In this example, the method first determines whether the series is an axial PET series. If the series is not an axial PET series, the entire series is rejected. If the series is an axial PET series, a text classifier and a head classifier will be applied to the series.

In the example in FIG. 8, the text classifier method first determines whether the number of slices is less than a threshold (e.g., IO slices). If N is less than the threshold, the text classifier is run on all slices and each slice is classified independently (e.g., pixels are masked for slices that have text and retained for slices that do not have text). If N is greater than the threshold, the method determines whether the series is a secondary capture. If the series is a secondary capture, the text classifier is run on all slices and each slice is classified independently (e.g., pixels are masked for slices that have text and retained for slices that do not have text). If the series is not a secondary capture, the text classifier is run on the last slice and the first I 0 slices. If the last slice has text, then the entire series is rejected. If the last slice does not have text, then the method determines whether the first IO slices all have text. If the first IO slices all have text, then the entire series is rejected. If the first IO slices do not all have text, the method estimates k, the instance of the last non-text instance and funs the text classifier on three random slices between k+I and N. If any of the three random slices have text, the entire series is rejected. If none of the three slices have text, all slices from k+I to N are accepted.

In the example in FIG. 8, the head classifier will process one in every two images and the last slice with a PET head classifier. Then, a heuristic is run on the head classifier outputs to estimate a head label for all instances. After the text classifier and head classifier are applied, the method will combine the text and head classifiers' outputs for a final output of de-identified images.

Figure 9A:
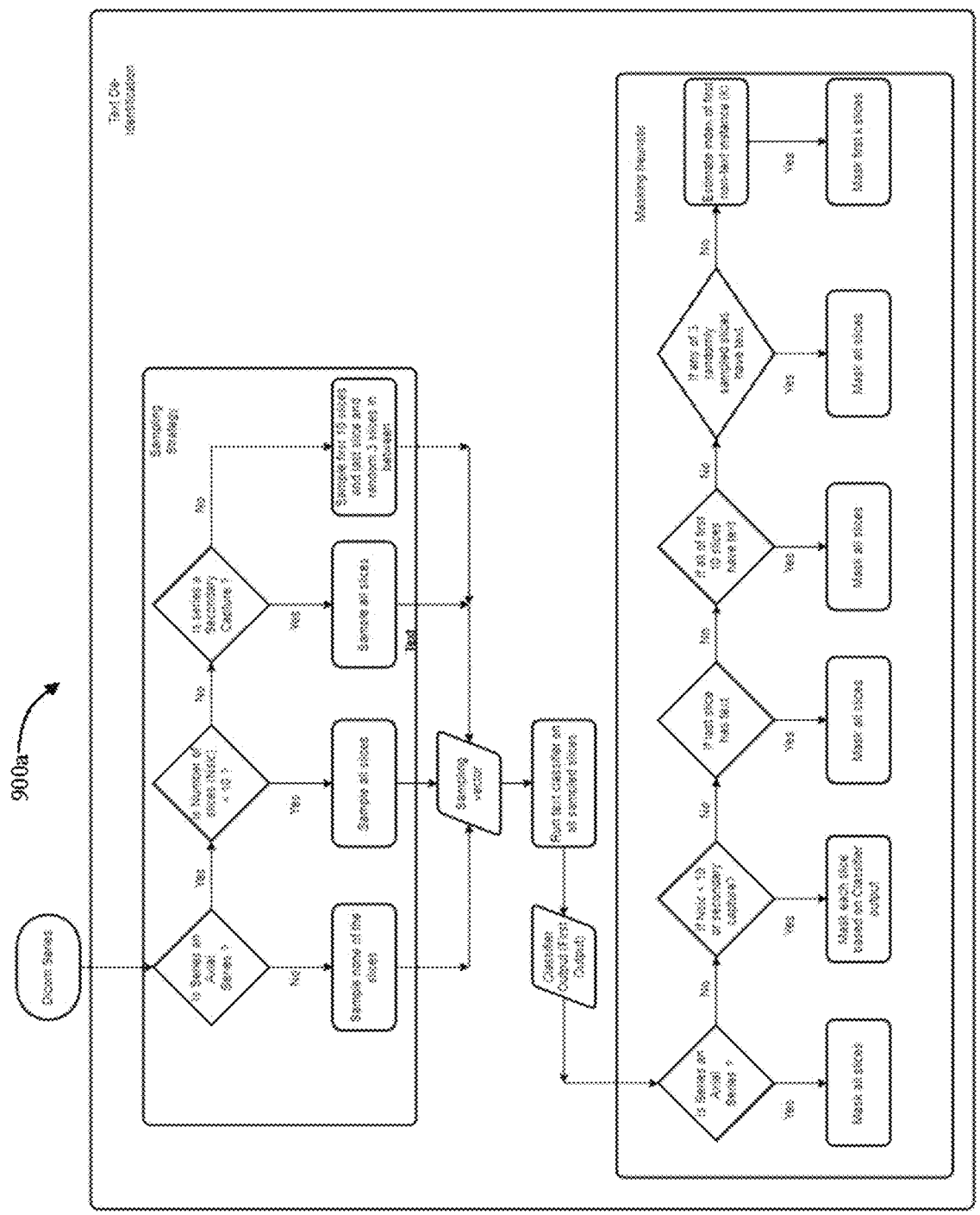
FIGS. 9A-9C show illustrative embodiments of methods and systems for de-identification of PET images, according to certain embodiments.
Figure 9B:
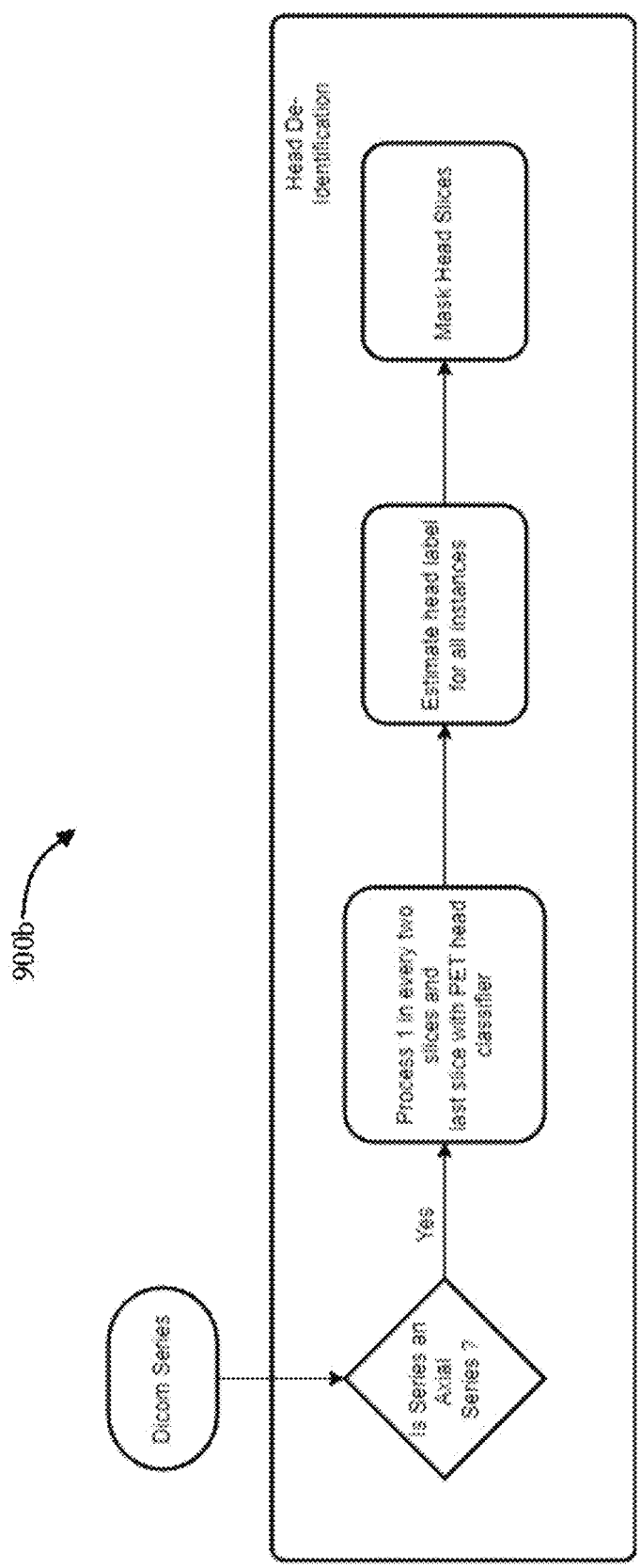
Figure 9C:
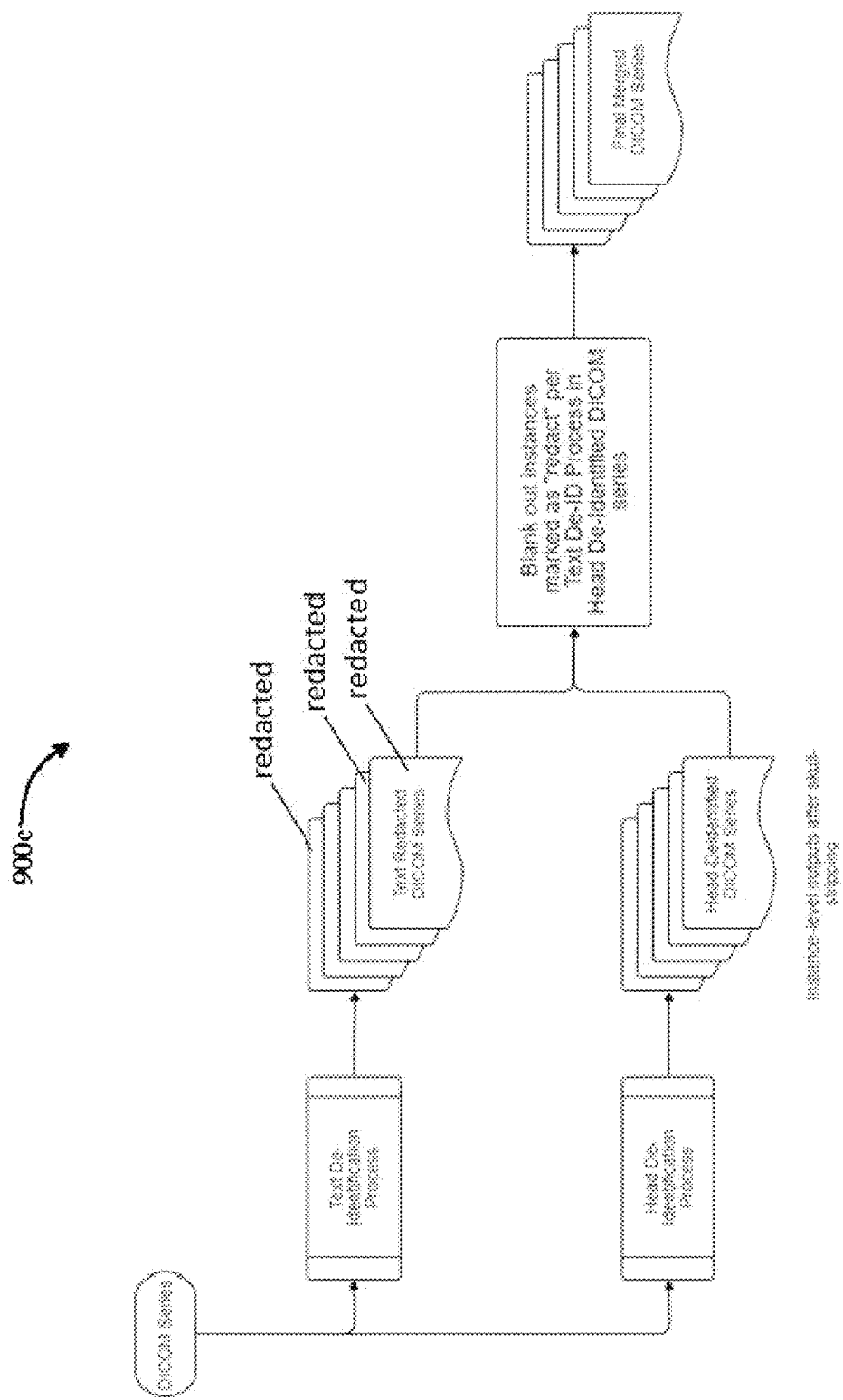

FIG. 9A shows an illustrative embodiment 900 of a PET text de-identification workflow. In this example, a DICOM series with N slices is de-identified. FIGS. 9A-9C shows an illustrative embodiments 900*a-c* of the methods shown in FIG. 8. First, a sampling strategy is selected. To select sampling strategy, the method first determines whether the series is an axial series. In this example, if the series is not an axial series, none of the slices are sampled and the entire series is rejected. Then, if the series is an axial series, the method determines whether the number of slices is less than a threshold (e.g., 10 slices). In this example, if N is less than the threshold, all slices are sampled. If N is not less than the threshold, the method determines whether the series is a secondary capture. If the series is a secondary capture, then all slices are sampled. If the series is not a secondary capture, then a different sampling strategy is selected, e.g., sample the first 10 slices and last slice and random 3 slices between. After a sampling strategy is selected, a sampling vector is computed indicating the probability of sampling each slice. Next, a text classifier is run on all sampled slices, based on the sampling vector, creating a classifier output (first output) for each sampled slice.

[Then, a masking heuristic is applied based on a combination of the classifier output and metadata. In the example shown in FIG. 9A, the method first determines whether the series is an axial series. In this example, if the series is not an axial series, all slices are masked. Then, if the series is an axial series, the method determines whether the number of slices is less than a threshold (e.g., 10 slices). In this example, if N is less than the threshold, each slice is masked based on the text classifier output. If N is greater than the threshold, the method determines whether the last slice has text. If the last slice has text, all slices are masked. If the last slice does not have text, the method will determine whether all of the first 10 slices have text. If yes, then all slices are masked. If not all of the first 10 slices have text, the method will determine whether any of the three randomly sampled slices have text. If yes, then all slices are masked. If no, then the method estimates the index of the first non-text instance k and masks the first k slices.

FIG. 9B shows an illustrative embodiment 900*b* of a PET head de-identification workflow that can be combined with a PET text de-identification workflow. First the method determines whether the series is an axial series. Then, one in every two slices and the last slice are processed with a PET head classifier and a head label is estimated for all instances. Finally, head slices are masked.

FIG. 9C shows an illustrative embodiment 900*c* PET de-identification workflow combining a PET text de-identification workflow and a head PET de-identification workflow. In this example, both a text de-identification process and a head de-identification process are run on the DICOM series. The text de-identification process outputs a text redacted series where a portion of slices (marked "redacted" in FIG. 9C) are masked or blanked. The head de-identification process outputs a skull stripped or head de-identified DICOM series. Then the method merges the two de-identification outputs by masking any slices of the skull stripped DICOM series where the corresponding slice is marked as "redact" by the text de-identification process.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology. Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a non-transitory computer-readable medium or computer program product, which includes all the features enabling the implementation of the methods described herein, and which, when loaded in a computer system is able to carry out these methods. Input to any part of the disclosed systems and methods is not limited to a text input interface. For example, they can work with any form of user input including text and speech. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

It will be appreciated that while one or more particular materials or steps have been shown and described for purposes of explanation, the materials or steps may be varied in certain respects, or materials or steps may be combined, while still obtaining the desired outcome.

Additionally, modifications to the disclosed embodiment and the invention as claimed are possible and within the scope of this disclosed invention.

Figure 10:
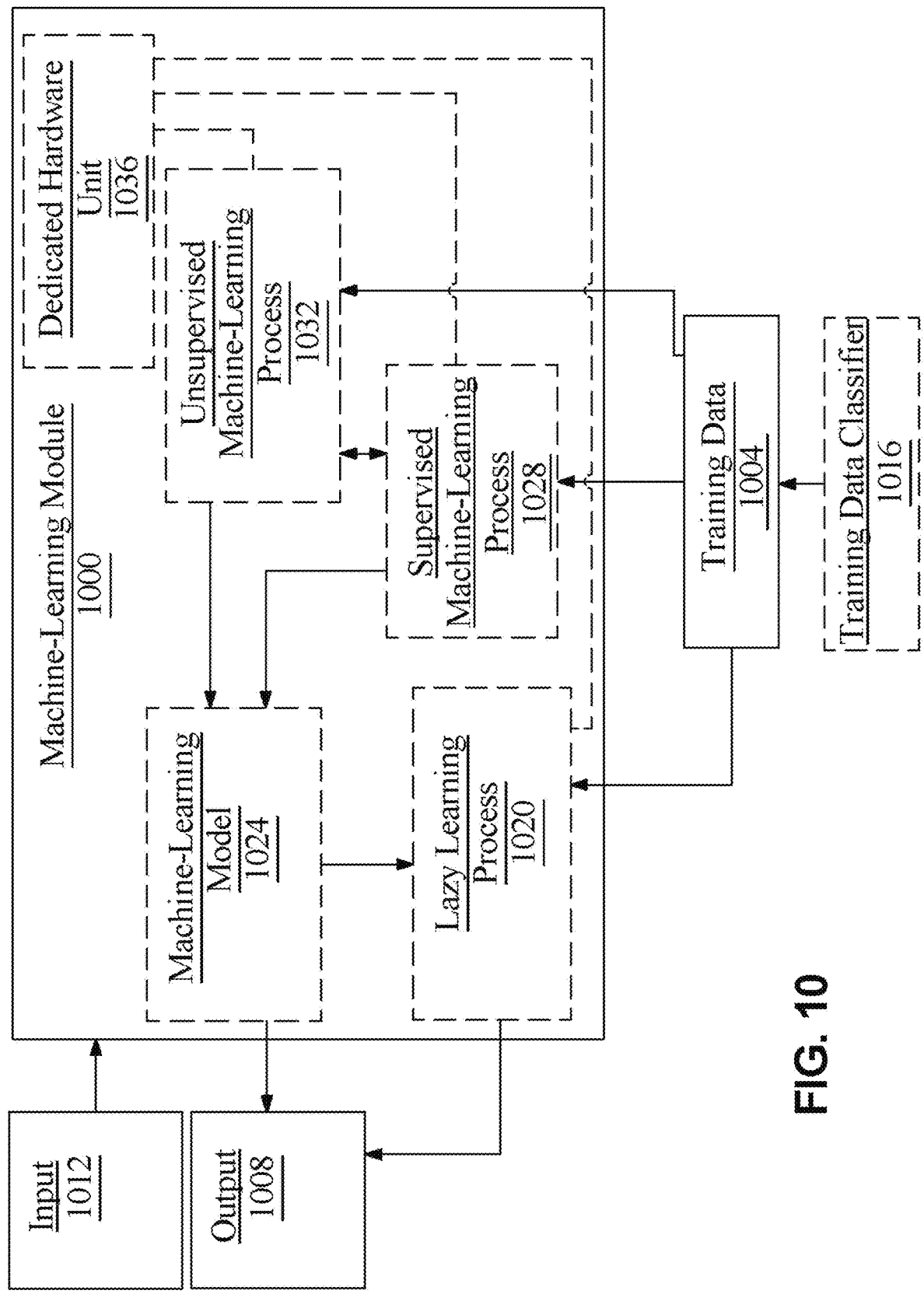
FIG. 10 is a block diagram of an exemplary machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm instantiated in hardware or software logic, data structures, and/or functions that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example inputs may include image slices and/or textual information as described above as inputs and outputs may include outputs such as textual information and/or information classes respectively as described above as outputs.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to various medical examination wherein each set of training data may be associated with a particular imaging device, a particular medical examination and the like. in an embodiments, words and/or phrases may appear more frequently in particular sets of examinations and/or imaging device wherein a machine learning model may predict words that have a higher likelihood of being present.

Still referring to FIG. 10, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 10, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 10, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 10, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 10, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 10, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 10, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 10, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 10, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 10, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 10, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 10, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as image slices as described above as inputs, outputs such as textual information as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

With further reference to FIG. 10, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 10, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1032 may not require a response variable; unsupervised processes 1032 may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 10, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 10, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 10, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 10, one or more processes or algorithms described above may be performed by at least a dedicated hardware unit 1036. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1036 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1036 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1036 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 11:
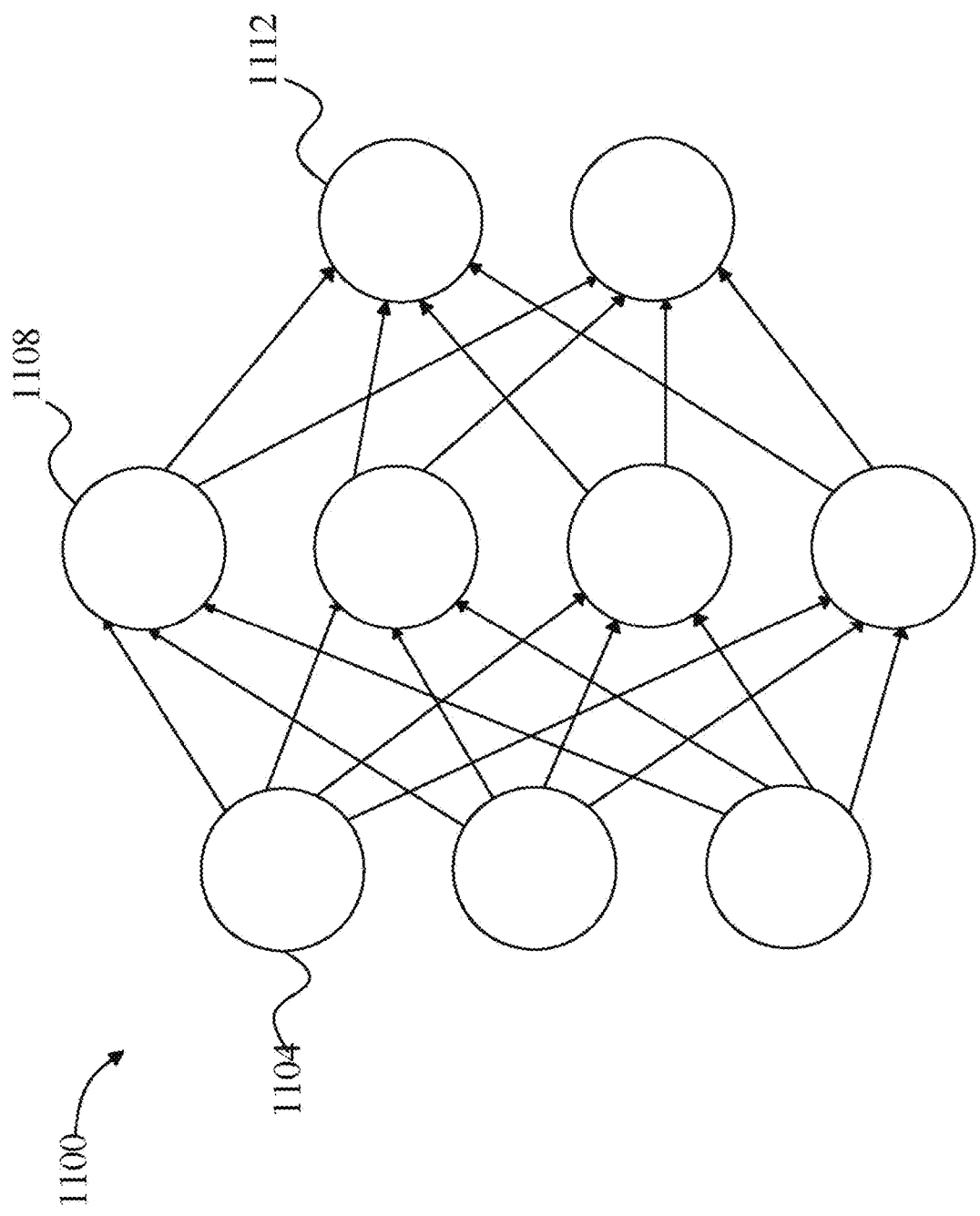
FIG. 11 is a diagram of an exemplary embodiment of a neural network.

Referring now to FIG. 11, an exemplary embodiment of neural network 1100 is illustrated. A neural network 1100 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1104, one or more intermediate layers 1108, and an output layer of nodes 1112. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 12:
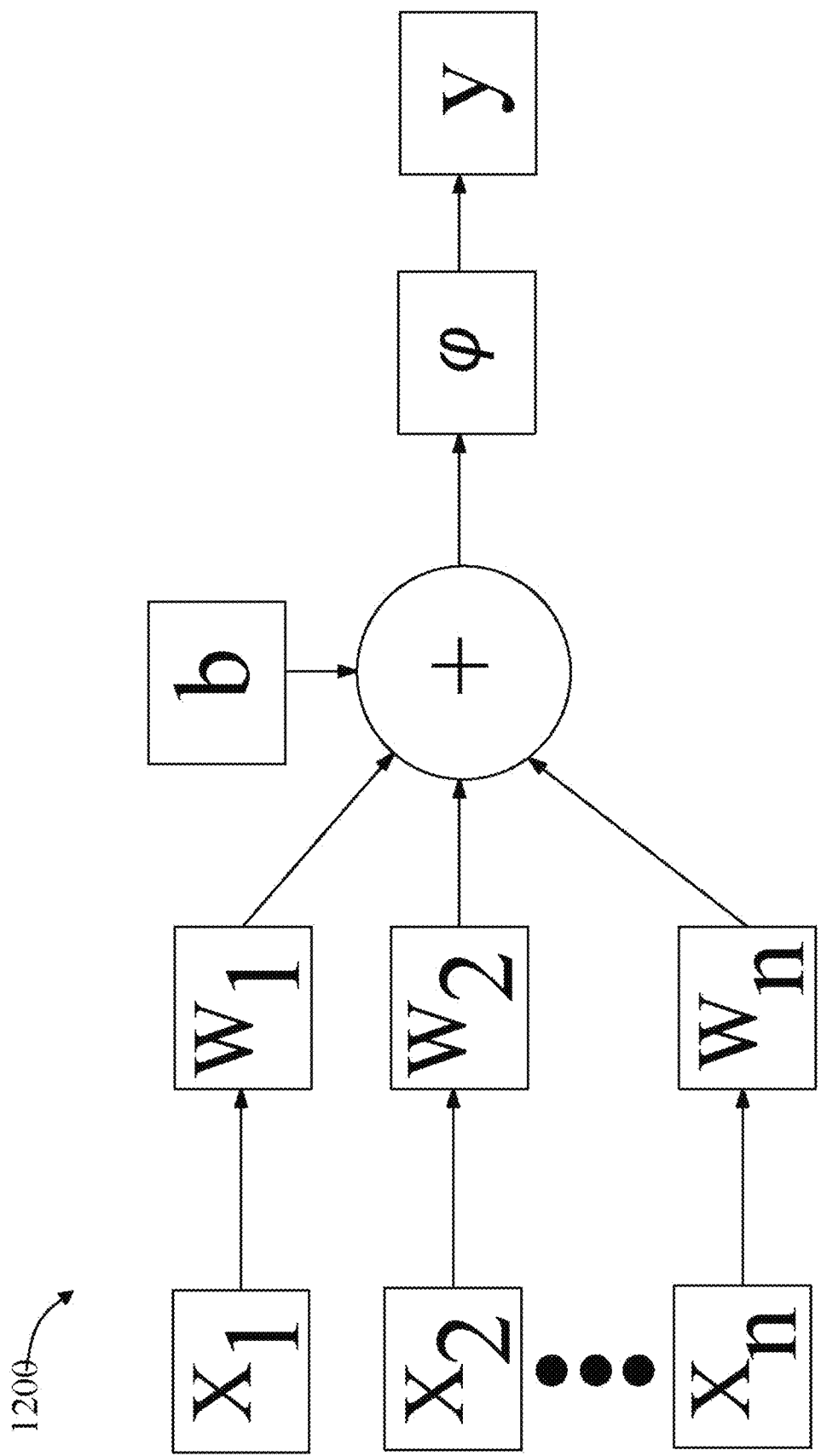
FIG. 12 is a diagram of an exemplary embodiment of a node of a neural network.

Referring now to FIG. 12, an exemplary embodiment of a node 1200 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^{-x}-e^{-x}}{e^x+e^{-x}},$$

a tan h derivative function such as $f(x)=\tan h^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 13:
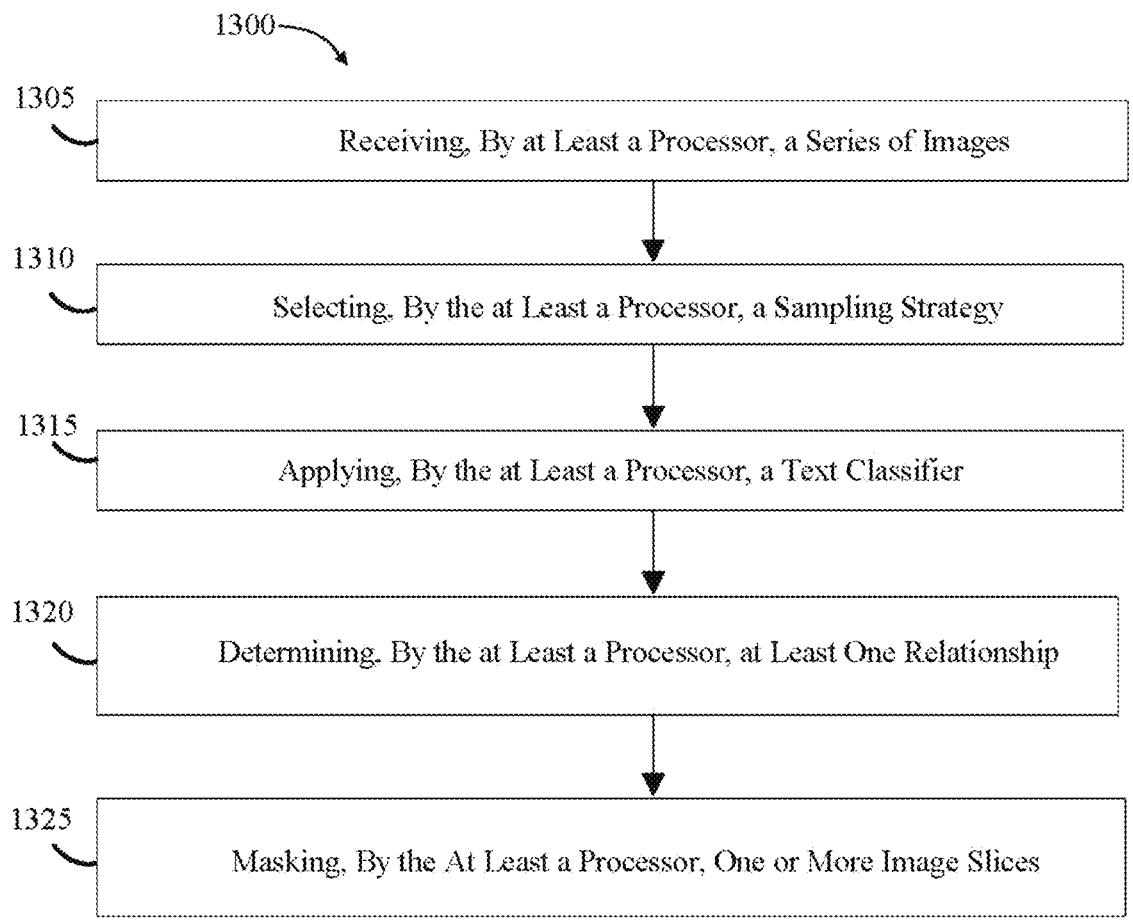
FIG. 13 is a flow diagram illustrating an exemplary embodiment of a method for de-identification of medical documents.

Referring now to FIG. 13, a method 1300 for de-identification of medical images is described. At step 1305, method 1300 includes receiving, by at least a processor, a series of images, the series of images including metadata and a plurality of image slices. This may be implemented with reference to FIGS. 1-12 and without limitation.

With continued reference to FIG. 13, at step 1310 method 1300 includes selecting, by the at least a processor, a sampling strategy as a function of the metadata, wherein the sampling strategy identifies a subset of image slices of the plurality of image slices to sample. In one or more embodiments, selecting, by the at least a processor, the sampling strategy as a function of the metadata includes identifying a modality within the metadata. In one or more embodiments, the subset of image slices includes at least a first image within the plurality of image slices. This may be implemented with reference to FIGS. 1-12 and without limitation.

With continued reference to FIG. 13, at step 1315 method 1300 includes applying, by the at least a processor, a text classifier to the subset of image slices identified by the sampling strategy, wherein the text classifier is configured to identify textual information on the subset of image slices. In one or more embodiments, applying, by the at least a processor, the text classifier to the subset of image slices identified by the sampling strategy further includes classifying the textual information to an information class. This may be implemented with reference to FIGS. 1-12 and without limitation.

With continued reference to FIG. 13, at step 1320 method 1300 includes determining, by the at least a processor, at least one relationship between the subset of images slices. In one or more embodiments, determining, by the at least a processor, the at least one relationship between the subset of images slices includes determining a secondary capture status of the subset of image slices. In one or more embodiments, determining, by the at least a processor, the at least one relationship between the subset of images slices includes determining a consecutive order of the subset of image slices. In one or more embodiments, determining, by the at least a processor, the at least one relationship between the subset of images slices includes providing a second output as a function of the presence of the textual information, the metadata, and a position of each image slice of the subset of image slices in the series of image slices, wherein the second output indicates whether to mask all image slices in the plurality of image slices and providing a third output as a function of the presence of textual information, the metadata, and the position of each image slice of the subset of image slices in the series of image slices, wherein the third output indicates whether to mask each image slice. This may be implemented with reference to FIGS. 1-12 and without limitation.

With continued reference to FIG. 13, at step 1325 method 300 includes masking, by the at least a processor, one or more image slices within the plurality of images slices as a function of the textual information and the at least one relationship. In one or more embodiments, masking, by the at least a processor, the one or more image slices within the plurality of images slices includes removing the textual information on the one or more image slices. In one or more embodiments, masking, by the at least a processor, the one or more image slices within the plurality of images slices as a function of the textual information and the at least one relationship includes comparing subset of images slices to a masking threshold as a function of the textual information and masking the one or more images slices as a function of the comparison. In one or more embodiments, masking, by the at least a processor, the one or more image slices within the plurality of images slices as a function of the textual information and the at least one relationship includes identifying personally identifiable information by comparing the textual information to one or more information classes and masking the personally identifiable information within the one or more image slices. In one or more embodiments, masking, by the at least a processor, the one or more image slices within the plurality of images slices as a function of the textual information and the at least one relationship includes removing at least one image slice from the plurality of image slices. In one or more embodiments, masking, by the at least a processor, the one or more image slices within of the plurality of images slices as a function of the textual information and the at least one relationship includes masking all image slices in the plurality of image slices if the second output for any image slice indicates all slices should be masked and masking any slice where the third output for that slice indicates that slice should be masked. This may be implemented with reference to FIGS. 1-12 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
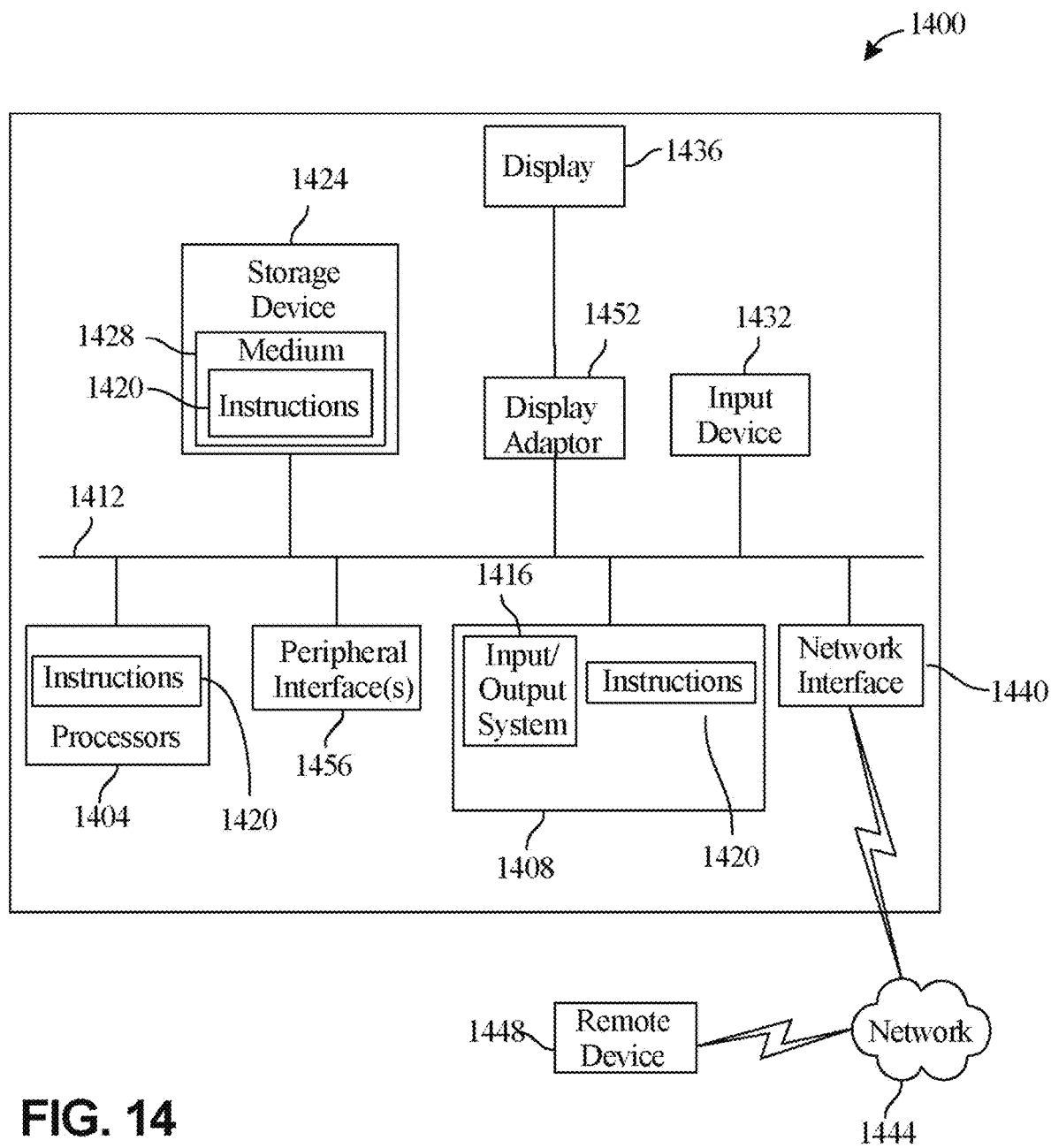
FIG. 14 is a block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Processor 1404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1404 may be organized according to Von Neumann and/or Harvard architecture as a non-limiting example. Processor 1404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1408 may include various components (e.g., machine-readable media) including, but not limited to, a random-access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for de-identification of medical images, the apparatus comprising:
    at least a processor; and
    a memory communicatively connected to the at least a processor, the memory containing instructions configuring the at least a processor to:
        receive a series of images, the series of images comprising metadata and a plurality of image slices;
        select a sampling strategy as a function of the metadata, wherein the sampling strategy identifies a subset of image slices of the plurality of image slices to sample;
        apply a text classifier to the subset of image slices identified by the sampling strategy, wherein the text classifier is configured to identify a presence of textual information on the subset of image slices;
        determine at least one relationship between the subset of images slices comprising:
            providing an output as a function of the presence of the textual information, the metadata, and a position of each image slice of the subset of image slices in the series of image slices, wherein the output indicates whether to mask all image slices of the plurality of image slices; and
        mask one or more image slices of the plurality of image slices as a function of the textual information and at least the output.

2. The apparatus of claim 1, wherein selecting the sampling strategy as a function of the metadata comprises identifying a modality within the metadata.

3. The apparatus of claim 2, wherein providing the output as a function of the presence of the textual information comprises:
    determining a subset of image slices of the plurality of images slices for which the presence of text is not expected;
    detecting the presence of the textual information in the subset of image slices; and
    masking all image slices of the plurality of image slices as a function of the detection of the presence of the textual information in the subset of image slices.

4. The apparatus of claim 2, wherein the sampling strategy comprises sampling all slices in the plurality of image slices if the series of images is a secondary capture.

5. The apparatus of claim 2, wherein the sampling strategy comprises:
    sampling a first ten slices of the plurality of image slices;
    sampling a last slice of the plurality of image slices; and
    sampling three randomly selected slices between the first ten slices and the last slice of the plurality of image slices.

6. The apparatus of claim 1, wherein determining the at least one relationship between the subset of images slices comprises determining a secondary capture status of the subset of image slices.

7. The apparatus of claim 1, wherein masking the one or more image slices within the plurality of images slices comprises removing the textual information on the one or more image slices.

8. The apparatus of claim 1, wherein determining the at least one relationship between the subset of images slices comprises determining a consecutive order status of the subset of image slices.

9. The apparatus of claim 1, wherein masking the one or more image slices of the plurality of images slices as a function of the textual information and the at least one relationship comprises:
    comparing the subset of images slices to a masking threshold as a function of the textual information; and
    masking the one or more images slices as a function of the comparison.

10. The apparatus of claim 1, wherein masking the one or more image slices of the plurality of images slices as a function of the textual information and the at least one relationship comprises:
    identifying personally identifiable information by classifying the textual information to one or more information classes; and masking the personally identifiable information within the one or more image slices.

11. The apparatus of claim 1, wherein masking the one or more image slices of the plurality of images slices as a function of the textual information and the at least one relationship comprises removing at least one image slice from the plurality of image slices.

12. The apparatus of claim 1, wherein:
determining the at least one relationship between the subset of images slices comprises:
providing an additional output as a function of the presence of textual information, the metadata, and the position of each image slice of the subset of image slices in the series of image slices, wherein the additional output indicates whether to mask each image slice of the subset of image slices; and
masking the one or more image slices of the plurality of images slices as a function of the textual information and the at least one relationship comprises:
masking all image slices of the plurality of image slices if the output for any image slice of the subset of image slices indicates that all image slices of the plurality of image slices should be masked; and
masking at least one image slice of the subset of image slices when the additional output for the at least one image slice indicates that the at least one image slice should be masked.

13. A method for de-identification of medical images, the method comprising:
receiving, by at least a processor, a series of images, the series of images comprising metadata and a plurality of image slices;
selecting, by the at least a processor, a sampling strategy as a function of the metadata, wherein the sampling strategy identifies a subset of image slices of the plurality of image slices to sample;
applying, by the at least a processor, a text classifier to the subset of image slices identified by the sampling strategy, wherein the text classifier is configured to identify a presence of textual information on the subset of image slices;
determining, by the at least a processor, at least one relationship between the subset of images slices comprising:
providing an output as a function of the presence of the textual information, the metadata, and a position of each image slice of the subset of image slices in the series of image slices, wherein the output indicates whether to mask all image slices of the plurality of image slices; and
masking, by the at least a processor, one or more image slices of the plurality of images slices as a function of the textual information and at least the output.

14. The method of claim 13, wherein selecting, by the at least a processor, the sampling strategy as a function of the metadata comprises identifying a modality within the metadata.

15. The method of claim 14, wherein providing the output as a function of the presence of the textual information comprises:
determining a subset of image slices of the plurality of images slices for which the presence of text is not expected;
detecting the presence of the textual information in the subset of image slices; and masking all image slices of the plurality of image slices as a function of the detection of the presence of the textual information in the subset of image slices.

16. The method of claim 14, wherein the sampling strategy comprises sampling all slices in the plurality of image slices if the series of images is a secondary capture.

17. The method of claim 14, wherein the sampling strategy comprises:
sampling a first ten slices of the plurality of image slices;
sampling a last slice of the plurality of image slices; and
sampling three randomly selected slices between the first ten slices and the last slice of the plurality of image slices.

18. The method of claim 13, wherein determining, by the at least a processor, the at least one relationship between the subset of images slices comprises determining a secondary capture status of the subset of image slices.

19. The method of claim 13, wherein masking, by the at least a processor, the one or more image slices within the plurality of images slices comprises removing the textual information on the one or more image slices.

20. The method of claim 13, wherein determining, by the at least a processor, the at least one relationship between the subset of images slices comprises determining a consecutive order status of the subset of image slices.

21. The method of claim 13, wherein masking, by the at least a processor, the one or more image slices of the plurality of images slices as a function of the textual information and the at least one relationship comprises:
comparing the subset of images slices to a masking threshold as a function of the textual information; and
masking the one or more images slices as a function of the comparison.

22. The method of claim 13, wherein masking, by the at least a processor, the one or more image slices of the plurality of images slices as a function of the textual information and the at least one relationship comprises:
identifying personally identifiable information by classifying the textual information to one or more information classes; and
masking the personally identifiable information within the one or more image slices.

23. The method of claim 13, wherein masking, by the at least a processor, the one or more image slices of the plurality of images slices as a function of the textual information and the at least one relationship comprises removing at least one image slice from the plurality of image slices.

24. The method of claim 13, wherein:
determining, by the at least a processor, the at least one relationship between the subset of images slices comprises:
providing an additional output as a function of the presence of textual information, the metadata, and the position of each image slice of the subset of image slices in the series of image slices, wherein the additional output indicates whether to mask each image slice of the subset of image slices; and
masking, by the at least a processor, the one or more image slices of the plurality of images slices as a function of the textual information and the at least one relationship comprises:
masking all image slices of the plurality of image slices if the output for any image slice of the subset of image slices indicates all slices of the plurality of image slices should be masked; and masking at least one image slice of the subset of image slices when the additional output for the at least one image slice indicates that at least one image slice should be masked.

* * * * *